C. W. UTZMAN.
MACHINE FOR MAKING PLASTER BOARD OR THE LIKE.
APPLICATION FILED SEPT. 3, 1918.
1,330,413.
Patented Feb. 10, 1920.
17 SHEETS—SHEET 1.
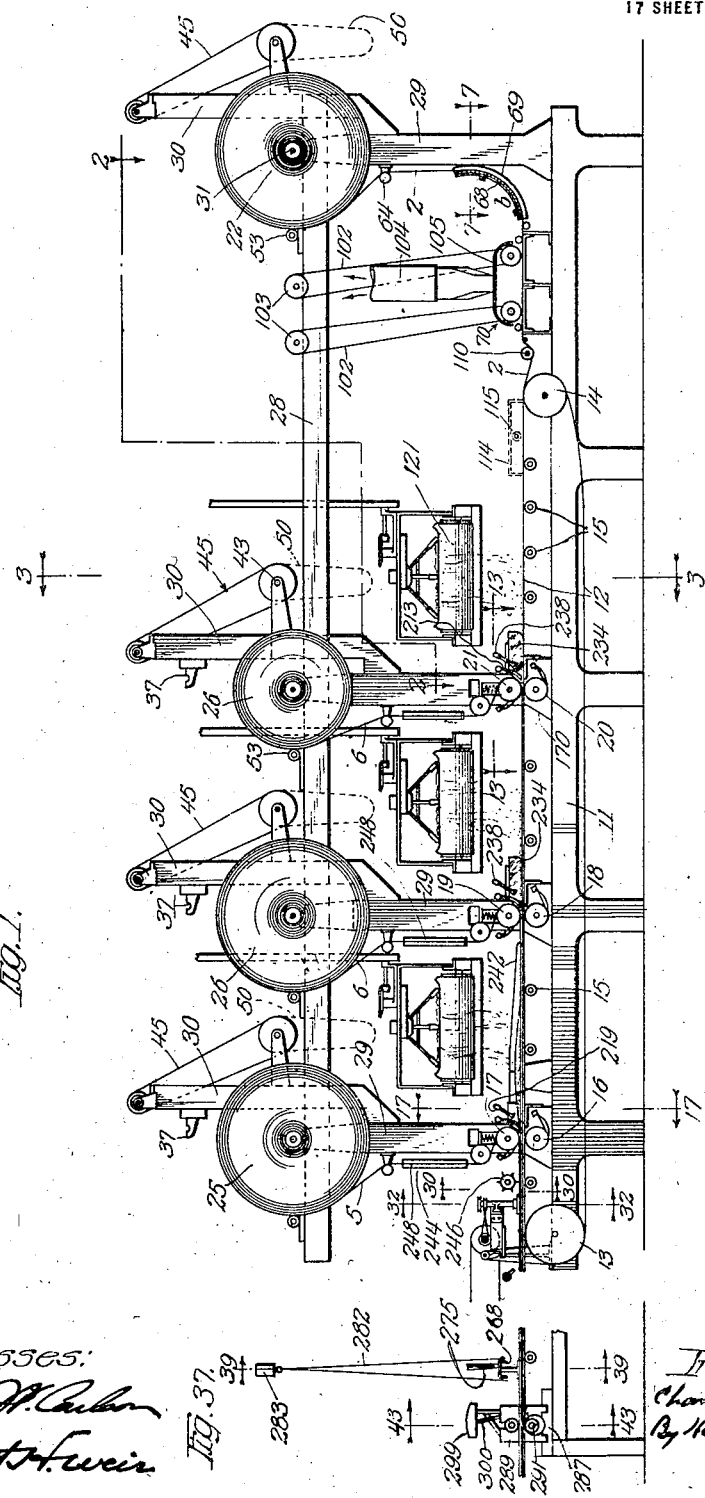

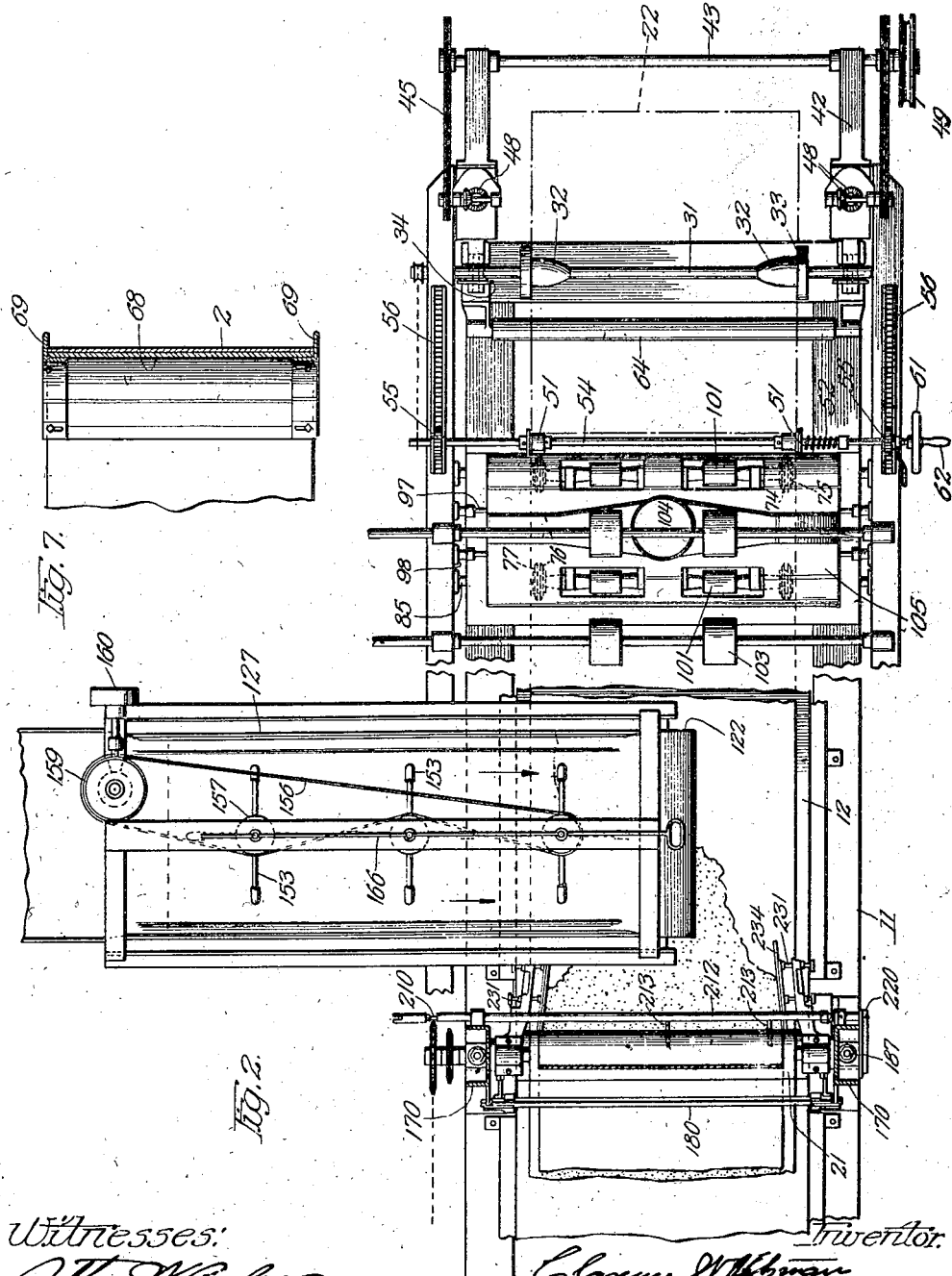

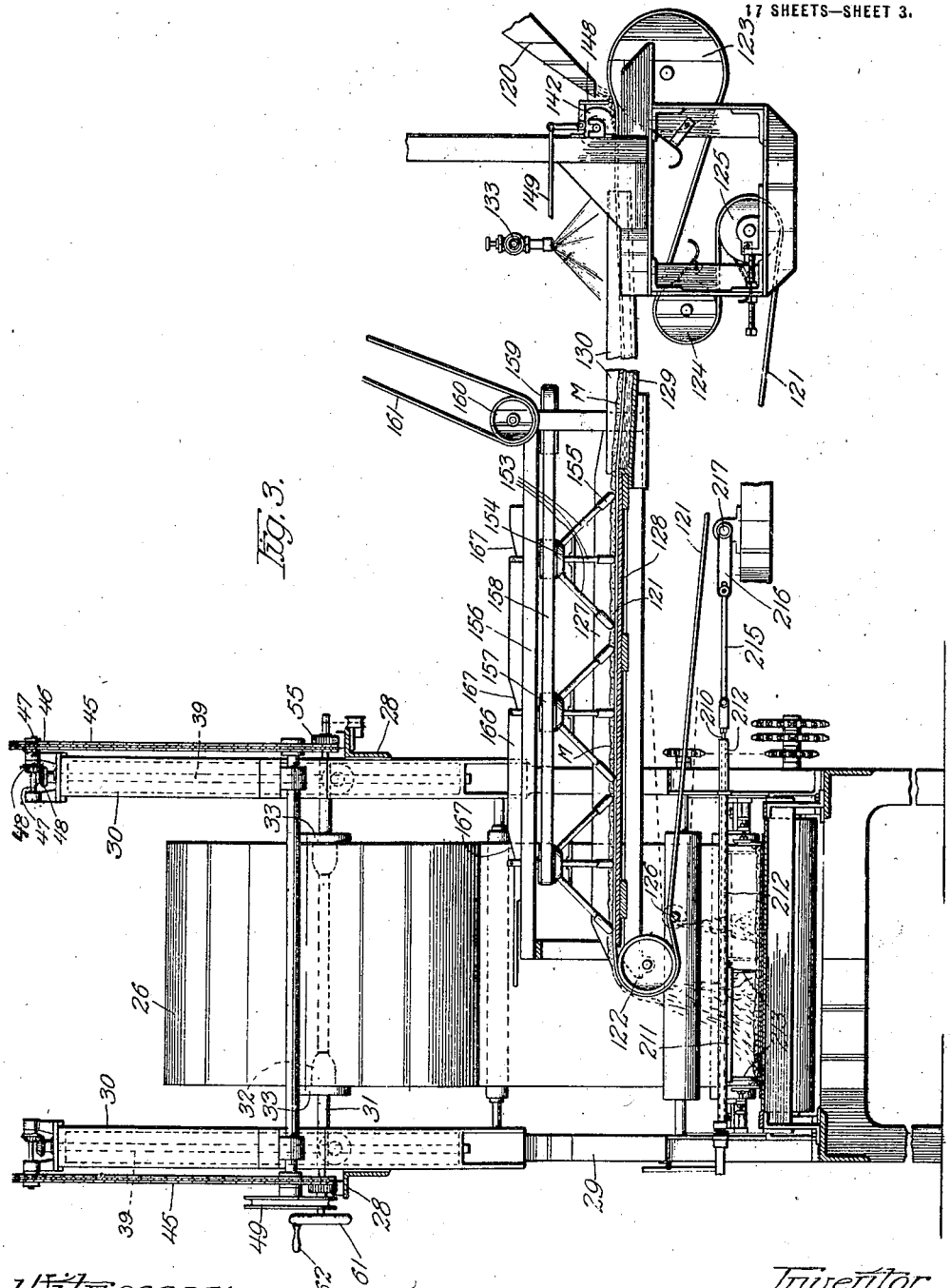

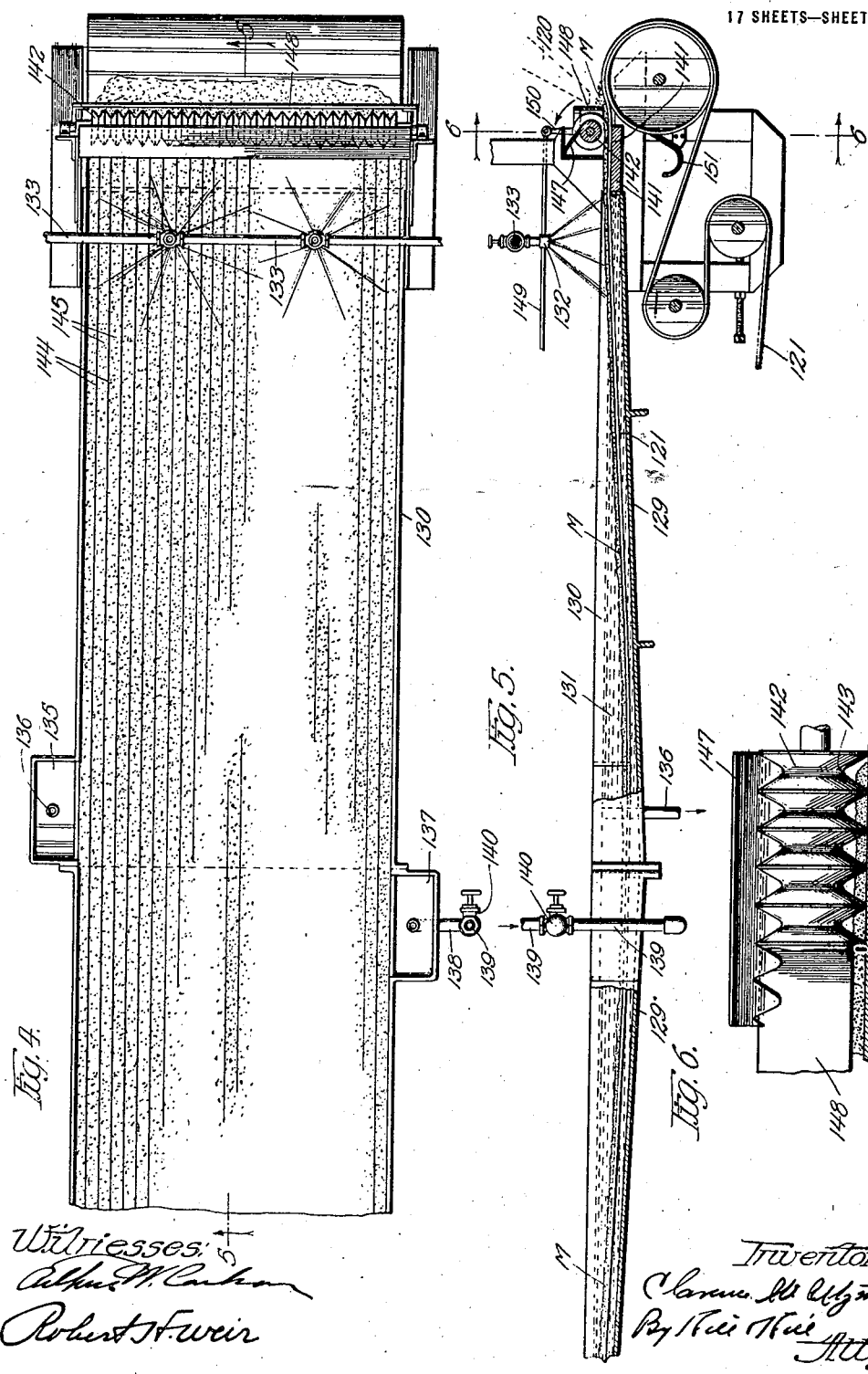

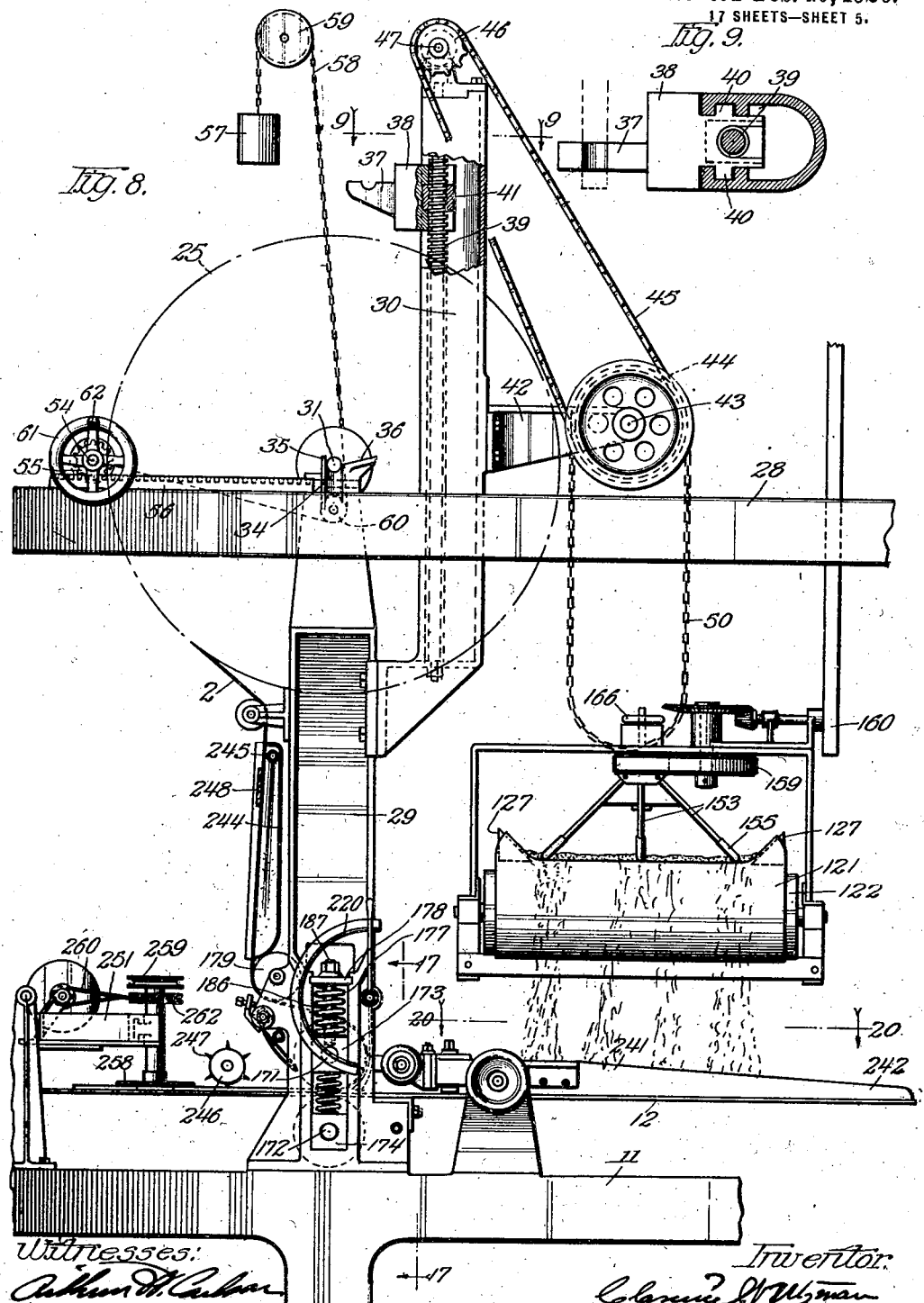

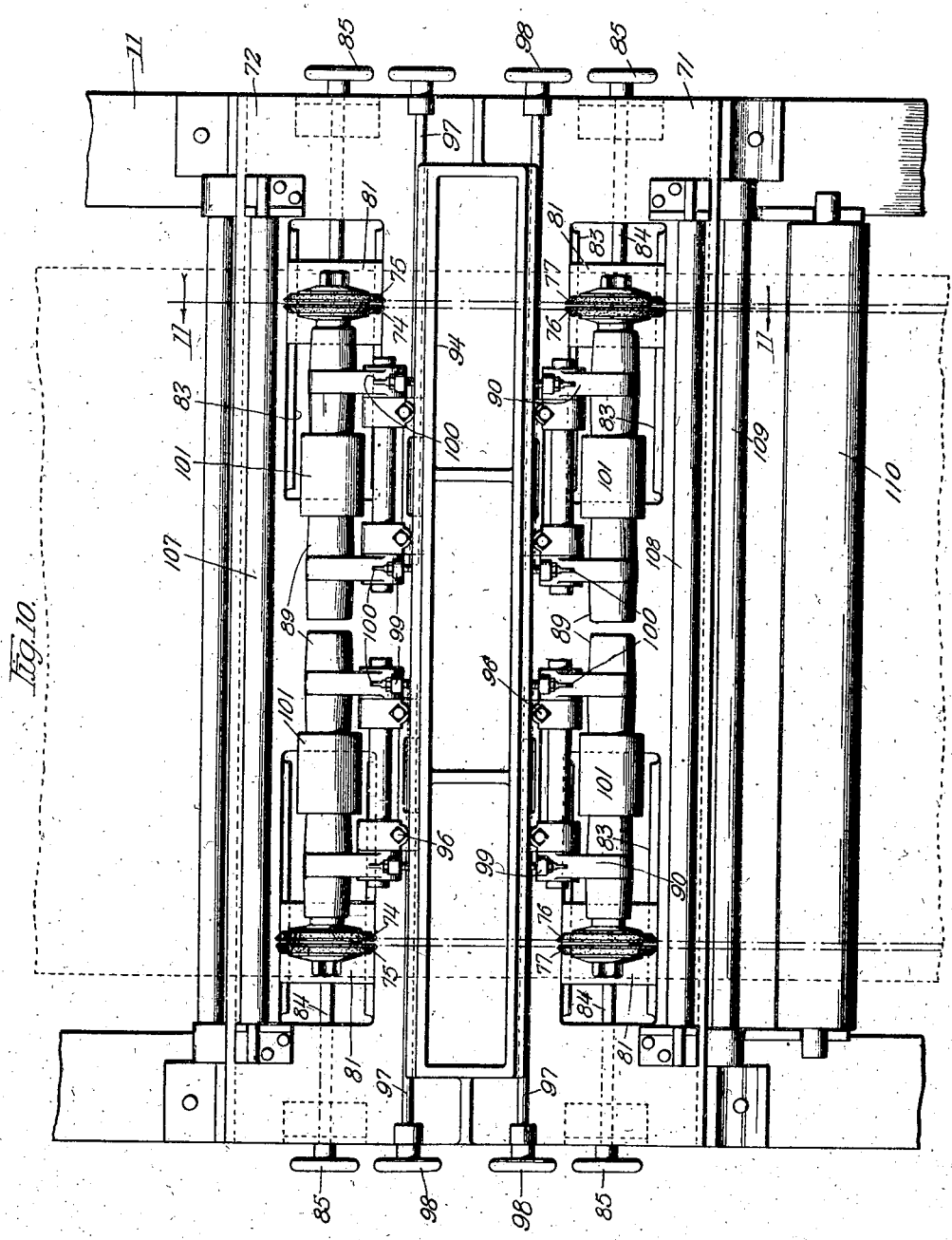

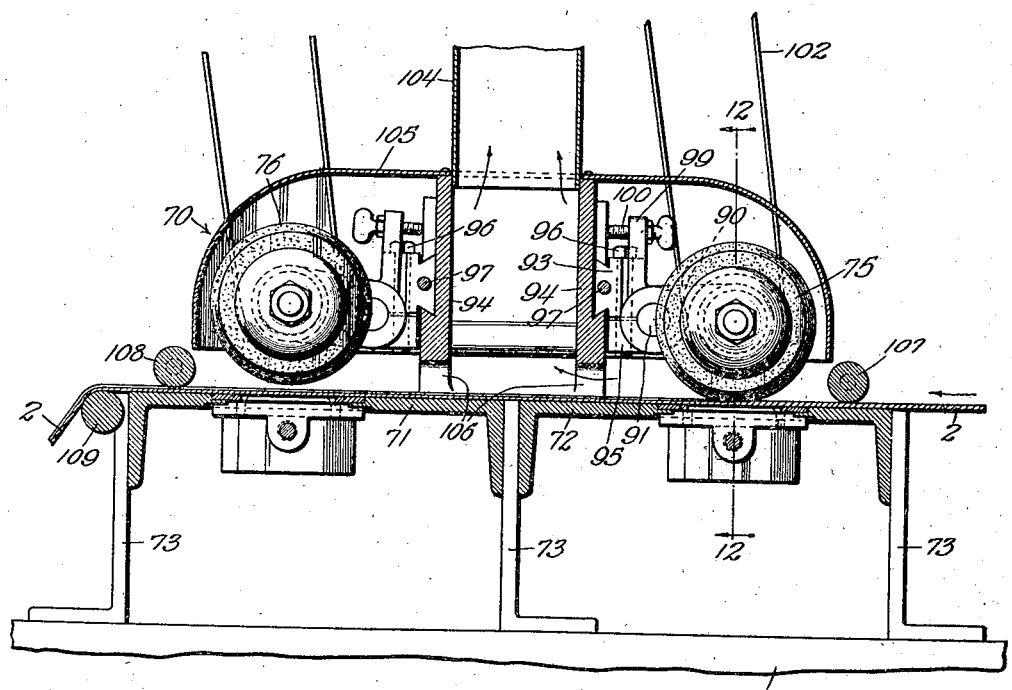
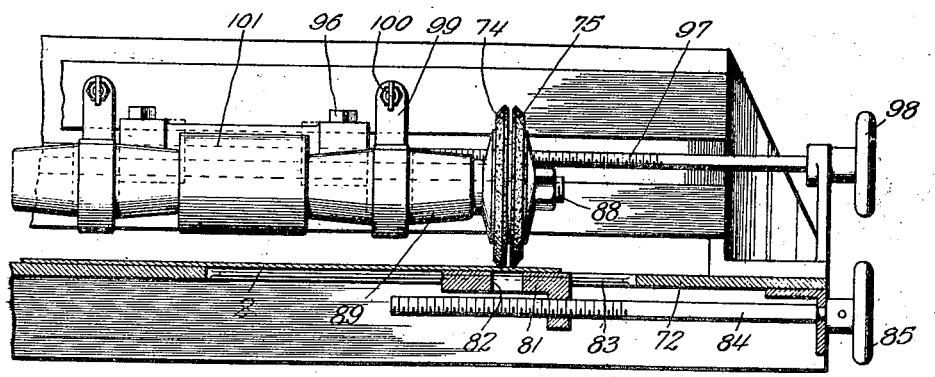

C. W. UTZMAN.
MACHINE FOR MAKING PLASTER BOARD OR THE LIKE.
APPLICATION FILED SEPT. 3, 1918.

1,330,413.

Patented Feb. 10, 1920.

Witnesses:

Inventor
Clarence W. Utzman
By Rice & Rice
Attys.

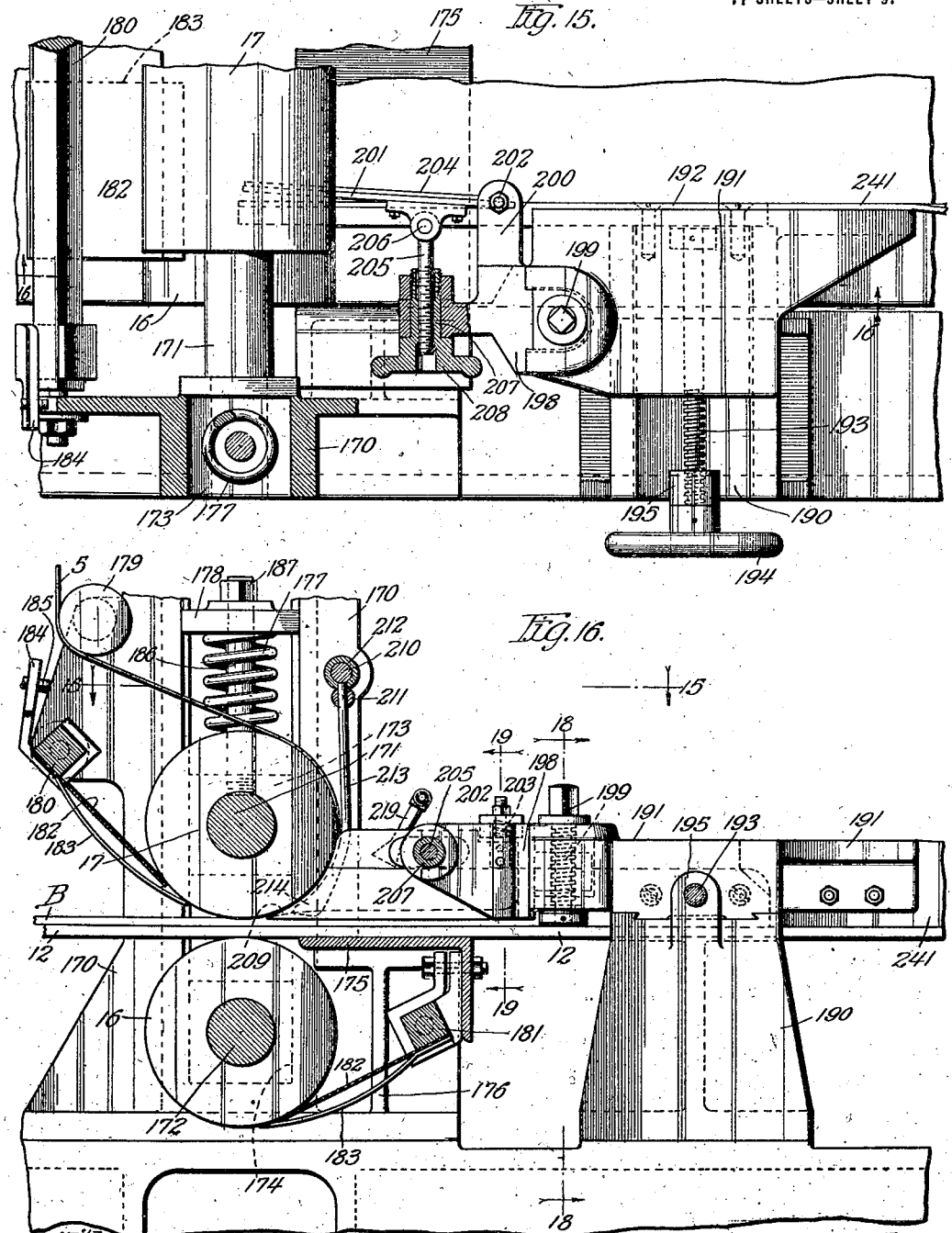

C. W. UTZMAN.
MACHINE FOR MAKING PLASTER BOARD OR THE LIKE.
APPLICATION FILED SEPT. 3, 1918.
1,330,413.
Patented Feb. 10, 1920.
17 SHEETS—SHEET 10.
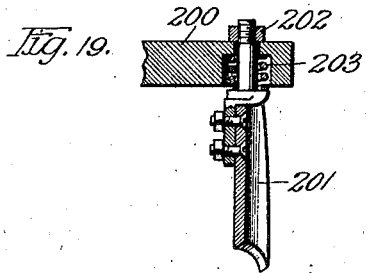
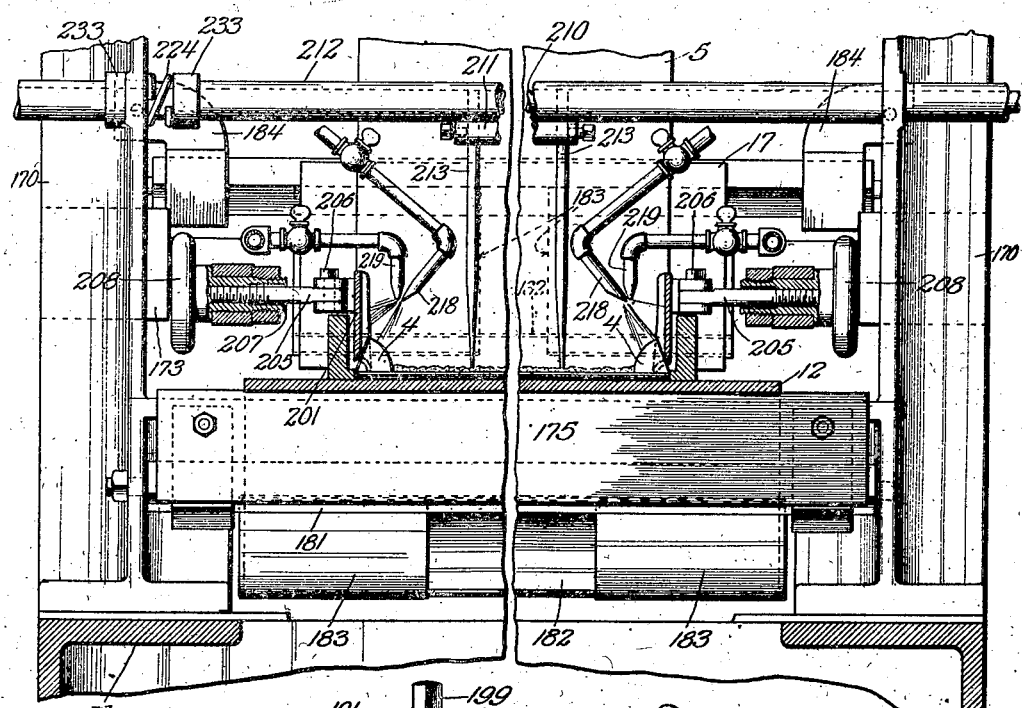
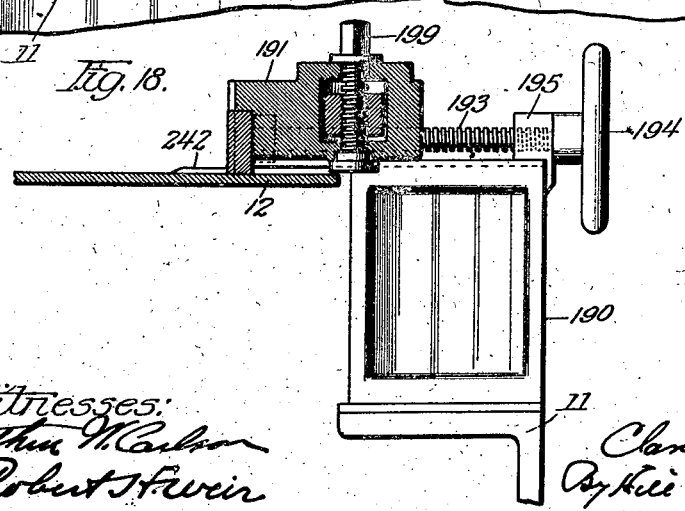

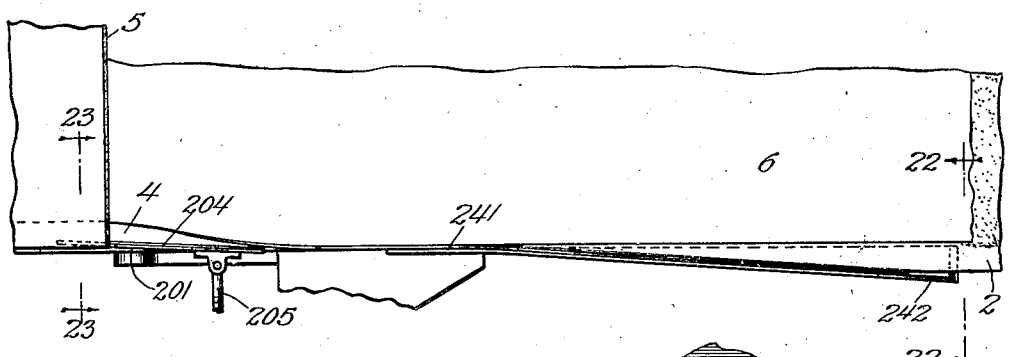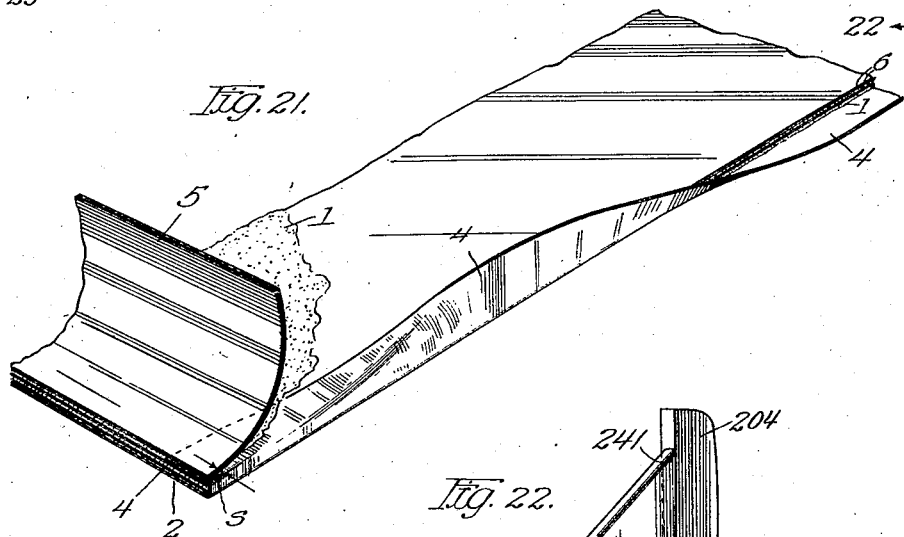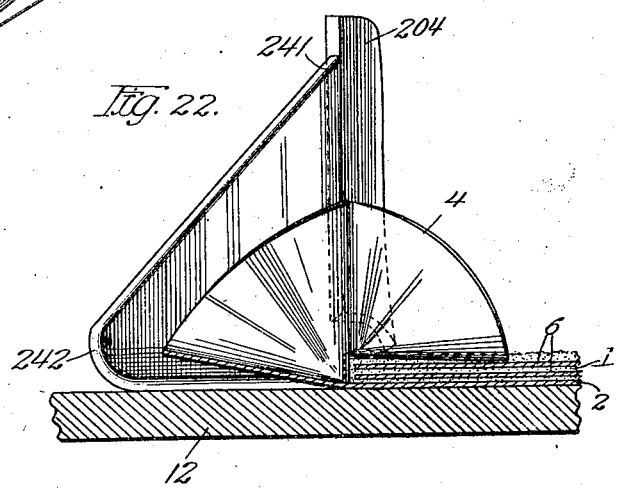

C. W. UTZMAN.
MACHINE FOR MAKING PLASTER BOARD OR THE LIKE.
APPLICATION FILED SEPT. 3, 1918.
1,330,413.
Patented Feb. 10, 1920.
17 SHEETS—SHEET 12.
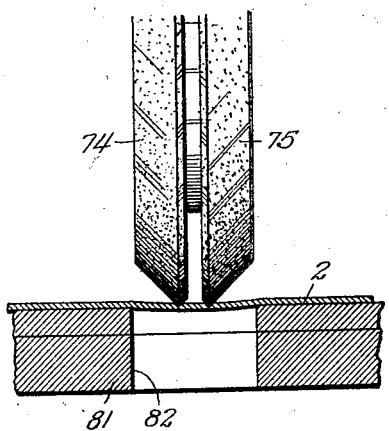
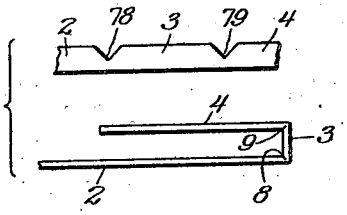
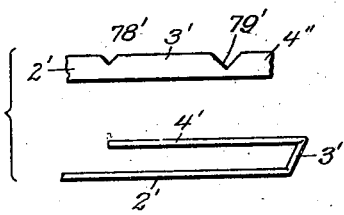
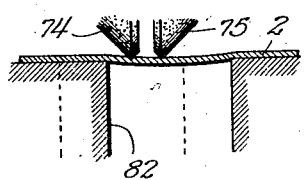
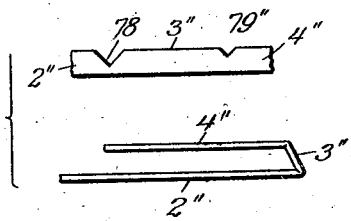
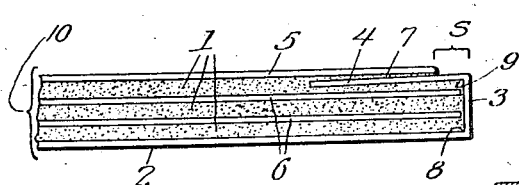
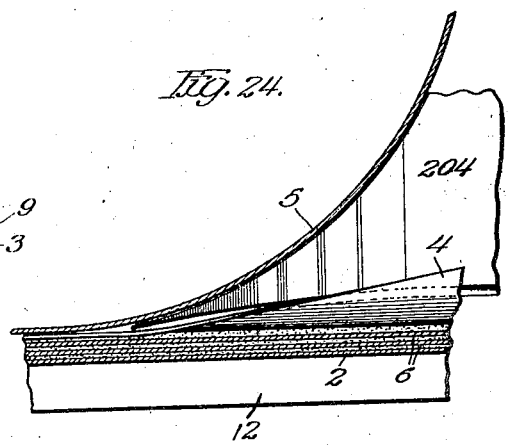

C. W. UTZMAN.
MACHINE FOR MAKING PLASTER BOARD OR THE LIKE.
APPLICATION FILED SEPT. 3, 1918.
1,330,413. Patented Feb. 10, 1920.
17 SHEETS—SHEET 13.
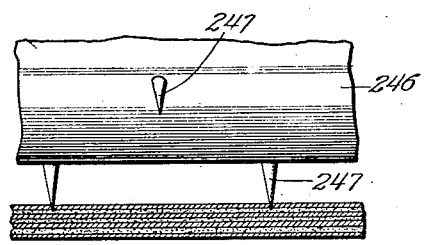
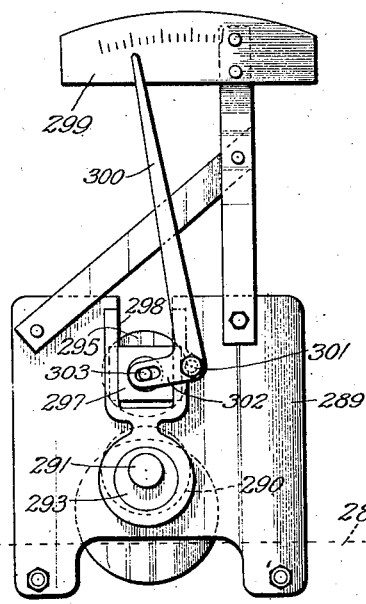
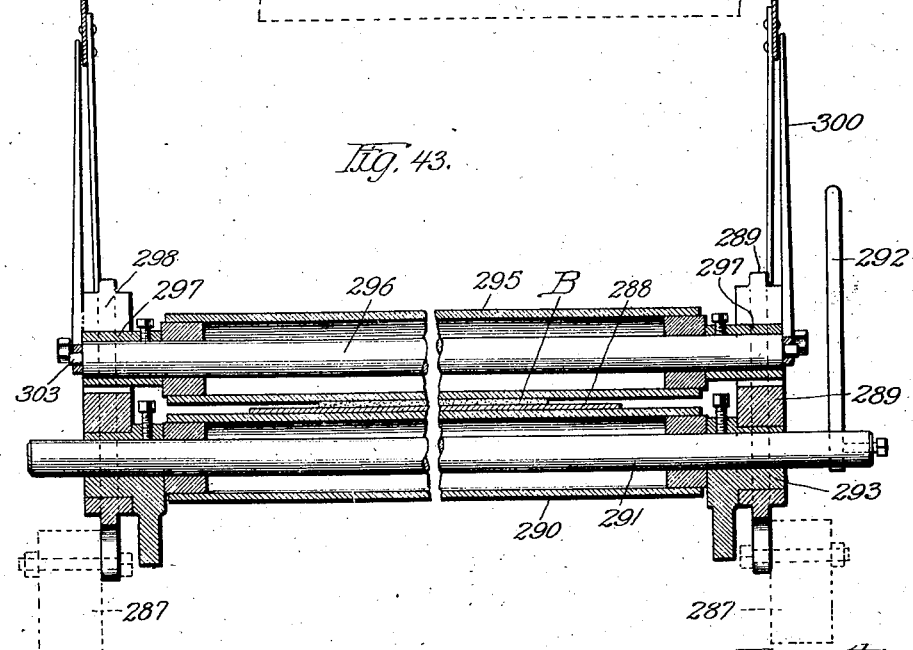

C. W. UTZMAN.
MACHINE FOR MAKING PLASTER BOARD OR THE LIKE.
APPLICATION FILED SEPT. 3, 1918.
1,330,413.
Patented Feb. 10, 1920.
17 SHEETS—SHEET 14.
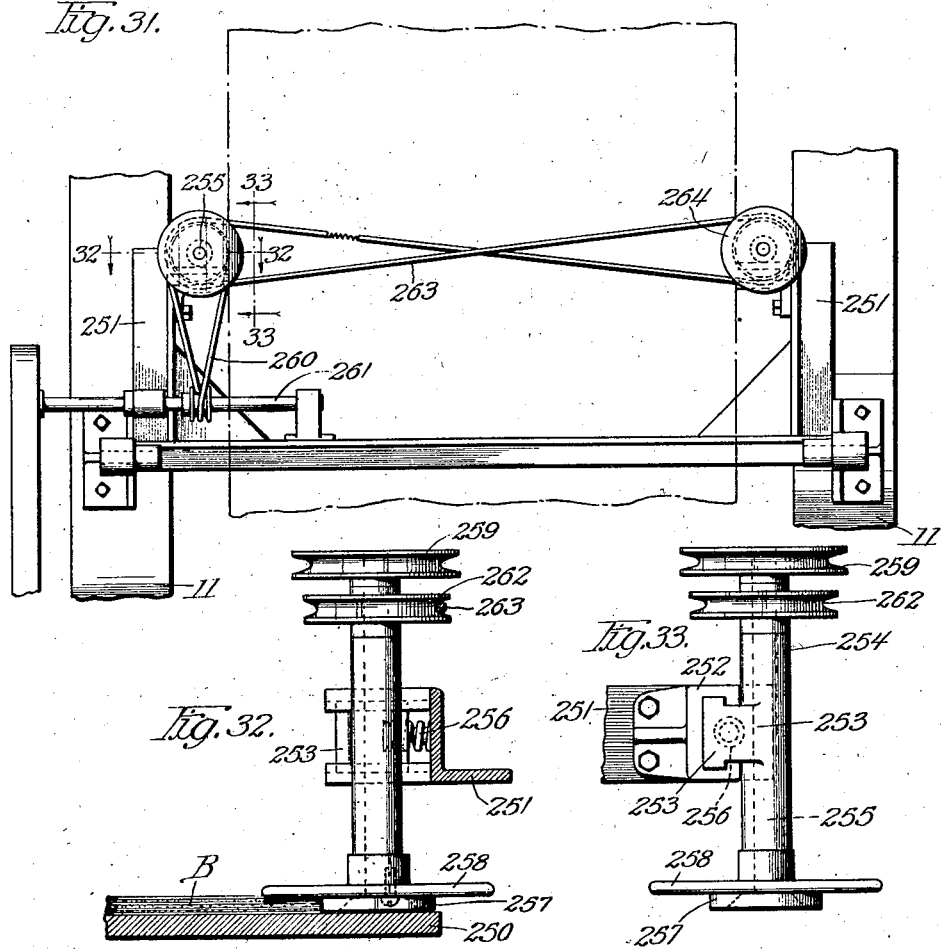

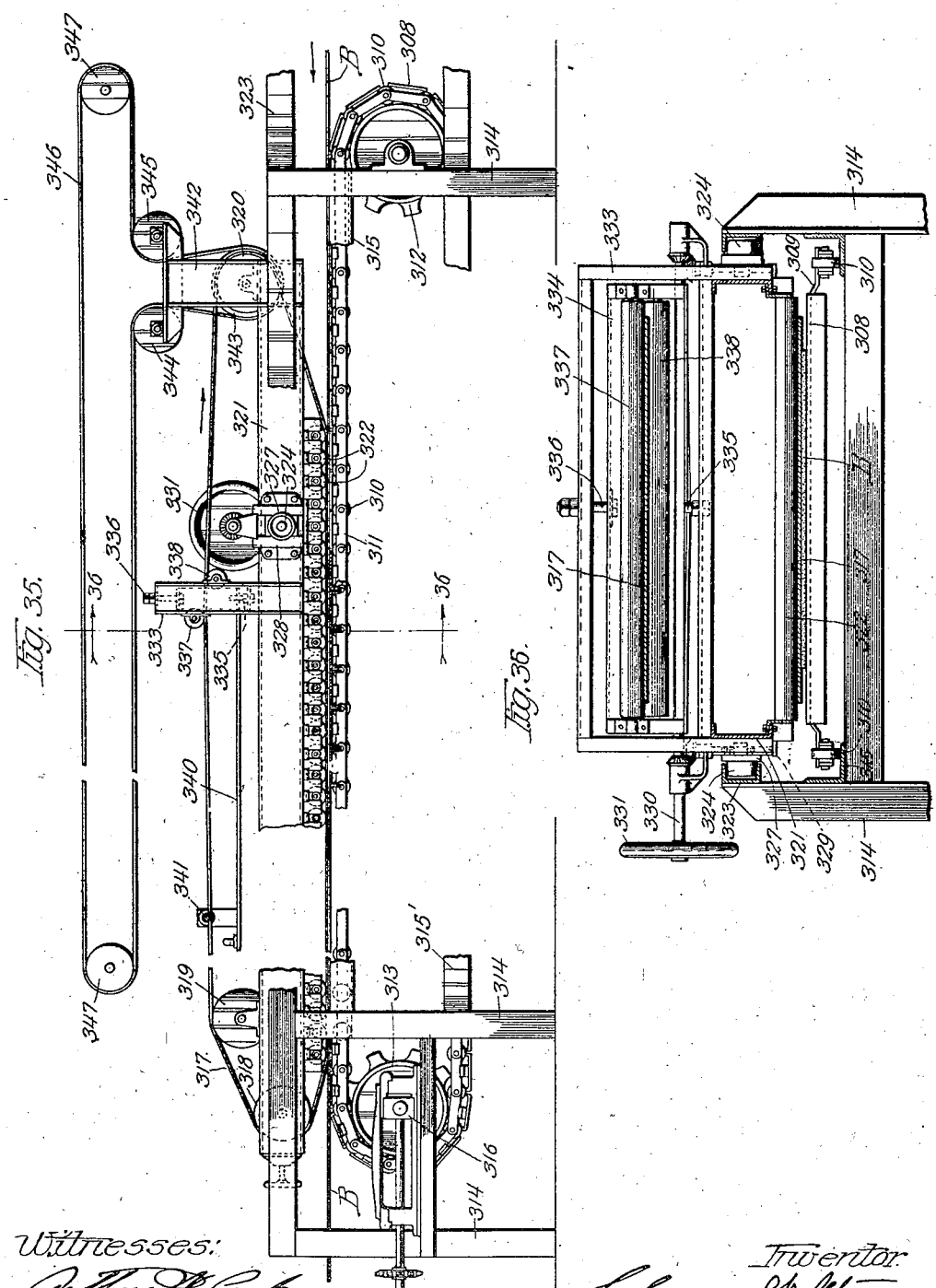

C. W. UTZMAN.
MACHINE FOR MAKING PLASTER BOARD OR THE LIKE.
APPLICATION FILED SEPT. 3, 1918.
1,330,413.
Patented Feb. 10, 1920.
17 SHEETS—SHEET 16.
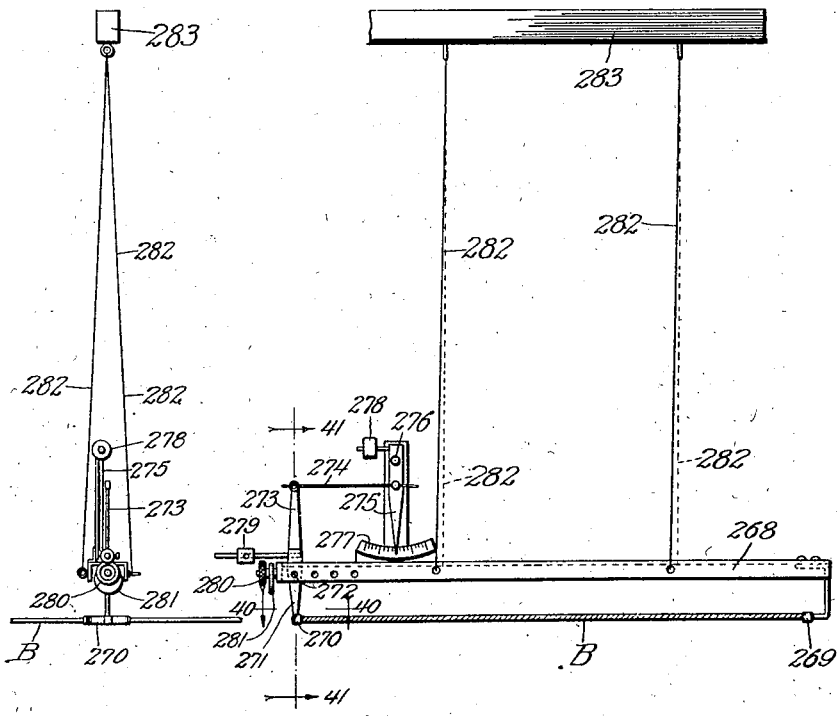

C. W. UTZMAN.
MACHINE FOR MAKING PLASTER BOARD OR THE LIKE.
APPLICATION FILED SEPT. 3, 1918.
1,330,413.
Patented Feb. 10, 1920.
17 SHEETS—SHEET 17.
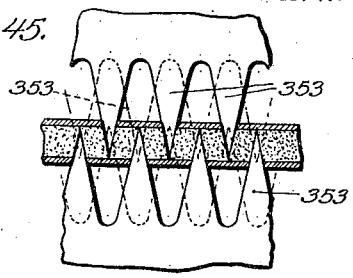
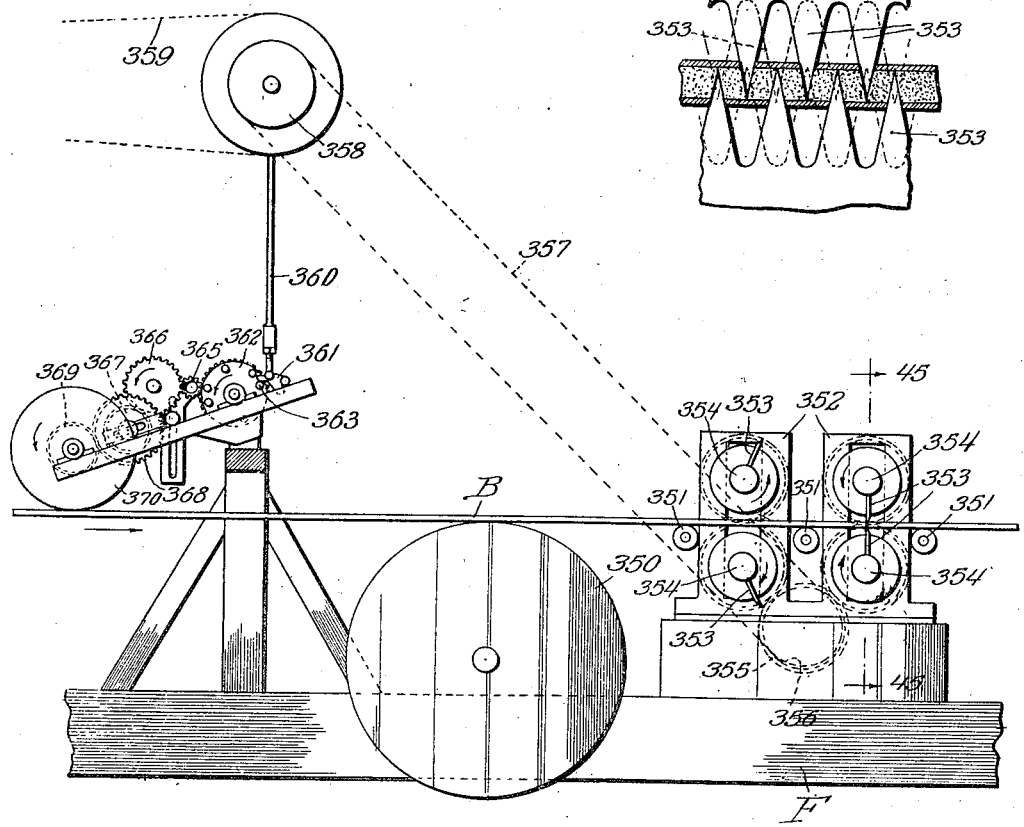
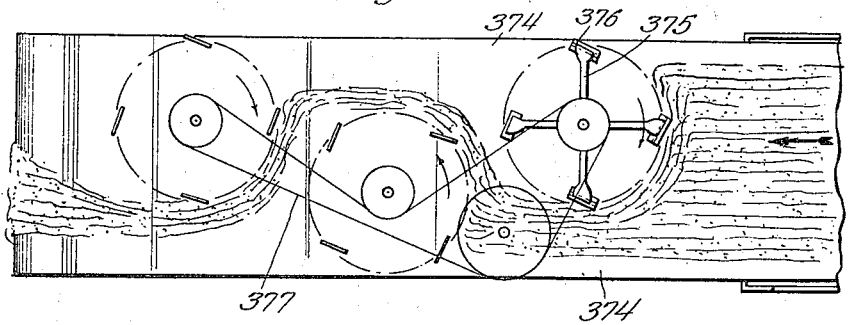

UNITED STATES PATENT OFFICE.

CLARENCE W. UTZMAN, OF CHICAGO, ILLINOIS, ASSIGNOR TO UNITED STATES GYPSUM COMPANY, OF CHICAGO, ILLINOIS, A CORPORATION OF NEW JERSEY.

MACHINE FOR MAKING PLASTER-BOARD OR THE LIKE.

1,330,413.  Specification of Letters Patent.  Patented Feb. 10, 1920.

Application filed September 3, 1918. Serial No. 252,403.

*To all whom it may concern:*

Be it known that I, CLARENCE W. UTZ-MAN, a citizen of the United States, residing at Chicago, in the county of Cook and State of Illinois, have invented certain new and useful Improvements in Machines for Making Plaster-Board or the like, of which the following is a description.

My invention belongs to that class of machines employed in the manufacture of plaster board or a board made up of a suitable body provided with covering sheets for containing the same. The invention has among its objects the production of a machine of the kind described that is simple, efficient, accurate and satisfactory for use wherever found applicable. More particularly it has as an object the production of a machine of the kind described which will manufacture a superior product in an economical manner with a minimum of labor and produce a continuous board which may be cut off in the desired lengths. The board produced is substantially uniform in size, that is, in width and thickness, as well as uniform in appearance and strength.

The invention also has as an object the production of a machine embodying the combination of a number of improved elements which are simple, efficient and satisfactory for use and which, coöperating together, produce the product mentioned. Among the further objects may be mentioned the production of improved handling mechanism for the covering material, guiding devices, scoring devices, conveying and mixing mechanism, spreaders and agitators, covering material treating means, folders, gages, perforators, smoothers, edge and face finishers, conveyers, cutters, etc., each of which will operate perfectly and uniformly, and when employed together will coöperate to produce an improved and uniform product. Many other objects and advantages of the constructions herein shown and described will be obvious to those skilled in the art from the disclosures herein given.

To this end, my invention consists in the novel construction, arrangement and combination of parts herein shown and described and more particularly pointed out in the claims.

In the drawings, wherein like reference characters indicate like or corresponding parts, Figure 1 is a sectional view and elevation of a portion of the machine illustrating the paper rolls, plastic material feeding mechanism, scoring and folding mechanism at the initial point in the manufacture or building up of the board;

Fig. 2 is a plan view of a portion of the same looking substantially on line 2—2 of Fig. 1;

Fig. 3 is a sectional view taken substantially on line 3—3 of Fig. 1;

Fig. 4 is a plan view of the continuation of the conveyer mechanism shown in Fig. 2;

Fig. 5 is a sectional view through the same taken substantially on line 5—5 of Fig. 4;

Fig. 6 is a sectional view taken substantially on line 6—6 of Fig. 5;

Fig. 7 is a sectional view taken substantially on line 7—7 of Fig. 1;

Fig. 8 is an enlarged view of a portion of the mechanism shown in Fig. 1, or side elevation of a portion of mechanism similar to that shown in Fig. 3;

Fig. 9 is a sectional view taken substantially on line 9—9 of Fig. 8;

Fig. 10 is a plan view of the scoring mechanism;

Fig. 11 is a sectional view taken substantially on line 11—11 of Fig. 10;

Fig. 12 is a sectional view taken substantially on line 12—12 of Fig. 11;

Fig. 15 is a plan view and partial sectional view of a portion of the mechanism shown in Figs. 2 and 13;

Fig. 16 is a side elevation of the pressure rolls, the same being taken substantially on line 16—16 of Fig. 15;

Fig. 17 is a sectional view taken substantially on line 17—17 of Figs. 1 and 8;

Fig. 18 is a sectional view taken substantially on line 18—18 of Fig. 16;

Fig. 19 is a sectional view taken substantially on line 19—19 of Fig. 16;

Fig. 20 is a plan view similar to a portion of Fig. 15, the same being a section taken substantially on line 20—20 of Fig. 8;

Fig. 21 is a perspective view of a portion of a board, illustrating the turning over of one of the covering sheets;

Fig. 22 is a sectional view taken substantially on line 22—22 of Fig. 20;

Fig. 23 is a sectional view through a piece of completed board;

Fig. 24 is a detailed view illustrating a step in the manufacture of the board;

Fig. 25 is a view illustrating the operation of one of the scoring wheels as shown in Figs. 11 and 12;

Fig. 26 is a similar view showing a different adjustment;

Figs. 27, 28 and 29 are detailed views illustrating different methods of scoring to produce different styles of edges on the boards;

Fig. 30 is a view of a portion of the perforating mechanism, the same being substantially a partial sectional view taken on line 30—30 of Fig. 1;

Fig. 31 is a plan view of the edge straightening device shown in Fig. 1;

Fig. 32 is a sectional view taken substantially on line 32—32 of Fig. 1, showing a portion of the mechanism illustrated in Fig. 31;

Fig. 33 is a side elevation of the same;

Fig. 34 is a sectional view through a portion of the board during the manufacture thereof, illustrating the purpose of the edge straightener shown in Fig. 31;

Fig. 35 is a side elevation of a portion of the machine, the same being an extension of Fig. 1 toward the left;

Fig. 36 is a sectional view taken substantially on line 36—36 of Fig. 35;

Fig. 37 is a side elevation of the width gaging mechanism, illustrated in detail in Figs. 38 and 39;

Fig. 38 is an enlarged view of the same;

Fig. 39 is substantially a sectional view taken on line 39—39 of Fig. 37;

Fig. 40 is a sectional view taken substantially on line 40—40 of Fig. 39;

Fig. 41 is a sectional view taken substantially on line 41—41 of Fig. 39;

Fig. 42 is an enlarged side elevation of the thickness gage shown in Fig. 37;

Fig. 43 is a sectional view taken substantially on line 43—43 of Fig. 37;

Fig. 44 is a view in elevation and partial sectional view of the cutter at the end of the machine, the same being at the left hand of the conveyer and pressing mechanism shown in Fig. 35, but looking from the opposite side;

Fig. 45 is a sectional view taken substantially on line 45—45 of Fig. 44; and

Fig. 46 is a view illustrating a modified arrangement of the stirring mechanism on the conveyer belt shown in Fig. 3.

Figure 13:
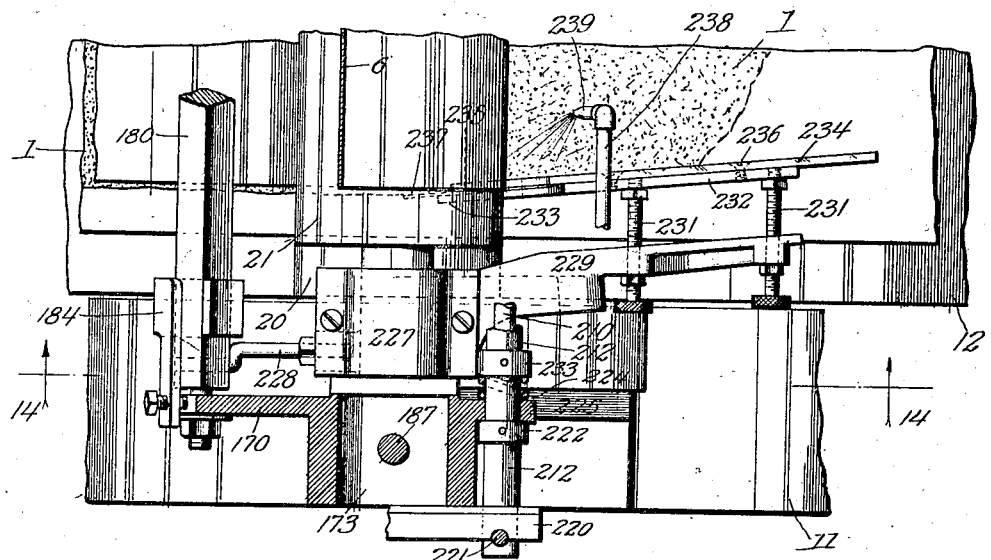
Fig. 13 is a plan view of a portion of the mechanism, the same being substantially a section taken on line 13—13 of Fig. 1, showing a portion of the mechanism illustrated in Fig. 2.

The machine herein described is intended to make a plaster board similar to that shown and described in my United States Letters Patent Number 1,034,746 and herein illustrated in Fig. 23. Various kinds of plaster board have been made heretofore, both in molds and by a continuous method by machine or otherwise, but the apparatus used in the manufacture has been more or less crude and depended to a large extent upon the skill of the operators, and the product has not been uniform. The present machine is intended to be operated by a minimum number of operators, to have a greater output and yet to produce an improved uniform product, the machine being so constructed that boards of various widths and thicknesses as well as of single or multiple ply, the machine being readily adjustable to produce the various products which may be required.

I shall first briefly describe the product itself, as with a clear understanding as to the product to be produced, the machine will probably be better understood and the purposes of the various coöperating mechanisms be clear.

The plaster board consists of a suitable body of plaster, plaster Paris or other suitable plastic material, which is covered with a fibrous material, for example paper, upon the two edges and opposite sides of the board, sheets of fibrous material or the equivalent being embedded in the plastic body if desired. Referring to Fig. 23, 1 represents the body which is inclosed on the two faces by the covering sheets 2 and 5, one sheet, as shown sheet 2, being folded up as at 3 to inclose the edge on both sides with the extreme edge 4 folded over to overlie the body. In the board shown, part 4 is folded over the body and cover sheet 5 then superimposed, the same being of a width to extend over the folded edge part 4. When so constructed, however, the same is preferably of a width so that it is spaced back a suitable distance, as for example as at 8, at each side. Where the edge 4 is superimposed over sheet 5, then the sheet 5 is of a width to extend to the part 3. The particular sample of board illustrated contains the fibrous sheets 6, it being understood that these may be omitted if desired. The machine illustrated is adapted to produce a board with or without the sheet 6, whichever may be preferred. The end or edge 4 and sheet 5 are sealed together in any suitable manner, preferably by letting the plastic material flow between the same as indicated at 7, regardless of which part is superimposed above the other. For the fibrous material I ordinarily prefer to use paper of suitable grade, and to facilitate the bending of the paper which may be in some instances comparatively stiff, as well as to produce sharp corners, and a straight edge, I score the same substantially at the points 8 and 9 so that the same may be bent easily.

The board is ordinarily formed at both edges as described and is a continuous board which is cut off in the desired lengths at the end of the machine. The plastic material, when the sheets 2 or 5 are applied, is in a plastic condition or more or less semi-fluid, the same setting or hardening before the cutting off mechanism is reached, which mechanism is usually placed near the end of the machine. From here it is taken from the machine and generally passed through a kiln. I have not considered it necessary, however, to describe in detail the handling of the same after it is cut off, as this forms no part of the present invention. Where the paper is specified as a covering in the specification or claims I wish to be understood as including paper or any equivalent material suitable for the purpose.

Referring first to Figs. 1, 2 and 3, 11 represents a suitable table or bed over which travels an endless belt or conveyer 12, the same extending over pulleys or rolls 13 and 14 arranged to be driven in any suitable manner. The conveyer 12 is supported between the pulleys 13 and 14 by rolls 15 or the equivalent. The conveyer also passes between one or more pairs of rolls, three pairs being shown, 16—17, 18—19 and 20—21, the purpose of which will be explained in detail hereafter. The paper or other fibrous material ordinarily comes in rolls and is fed therefrom into the machine. Roll 22 represents the roll from which the cover sheet 2 is drawn, roll 25 that from which sheet 5 is drawn and rolls 26—26 the rolls from which sheets 6—6 are drawn.

These rolls of paper are usually of considerable weight and consequently difficult to handle. It is necessary to change or renew the rolls from time to time and desirable to make the change as quickly as possible as the plastic material, depending upon the kind used, sets more or less rapidly. To facilitate the handling of the paper to be fed to the machine, I carry the rolls from an upper supporting frame consisting of the columns 29 supporting the beams 28.

As most clearly shown in Figs. 2 and 8, the columns or standards 29 carry standards 30, forming part of paper handling lifts or hoists. While any suitable means may be provided for handling and supporting the rolls of paper, my preferred mechanism is shown in Figs. 1, 3 and 8, it being understood that mechanism is provided for each roll, and these being similar, a description of one will suffice for all, portions of one being shown on one figure and similar portions of others being shown in other figures, depending upon where the section or view is taken. The paper rolls when in operative position in the construction shown are carried by the upper end of the columns 29. Usually a core is inserted in the roll so that it may be conveniently carried and unrolled. The rolls shown are arranged on shafts 31 which are provided with core members 32, preferably flanged as at 33. The shafts 31 are of a length to project over and be carried by a the bearings 34, at one side of which is a stop 35 and at the other side an inclined support 36. When the hoisting mechanism shown is employed the same is provided with movable brackets 37 arranged to carry the shaft and roll of paper and lower the same to a point where the shaft 31 may be rolled down the incline 36 onto its bearing 34. When seated shaft 31 clears the brackets 37, which may then be raised. Brackets 37 are shown mounted on travelers 38, each having engaging parts 40 constructed to engage with the part 30, as most clearly shown in Figs. 8 and 9. A screw member 39 is arranged to actuate the traveler 38, which in the construction shown is provided with a non-rotatable nut 41 threaded to engage the screw 39. A mechanism similar to that described is arranged at each side of the end of the roll of paper (see Fig. 3), and mechanism provided with simultaneously operating the jack-screws 39 constituting the hoist, so that the paper may be evenly lifted into place. This mechanism is most clearly shown in Figs. 2, 3 and 8. Carried by each upright part 30 is a bracket 42 which carries shaft 43, upon which may be arranged a sprocket wheel 44 or the equivalent. Sprocket chain 45 is arranged to drive a sprocket wheel 46, one for each upright 30, which drives shaft 47, and through the bevel gearing 48 drives the screw shafts 39 in unison. Shaft 43 may be operated by providing a pulley 49 and chain or the equivalent 50. Obviously, as shaft 43 is driven through the mechanism described brackets 37 are lifted or lowered. Arranged at one side of the roll of paper is a shaft 54 provided with flange members 51 (Fig. 2), one of which may be secured in place on the shaft in any suitable manner, and the other of which is preferably yieldingly secured and maintained in operative position to engage the edge of the paper by spring 52 or the equivalent. Referring to Figs. 2 and 8, shaft 54 is provided with a gear wheel 55, or the equivalent at each side, arranged on racks 56 carried by the frame bars 28. A weight 57 is connected to a cable 58, and this extends over pulley 59 and pulley 60 and is secured to shaft 54, the same tending to move shaft 54 toward shaft 31 as the paper is unwound and maintain the flange members 51 in close engagement with the roll of paper, retarding the unreeling of the paper and guiding or causing it to run true. The flanges are preferably arranged so that they may be adjusted on the shaft. Obviously, the gears 55 and racks 56 cause the shaft 54 to move parallel at all times with the shaft 31. The shaft 54 is so constructed that it may be adjusted lengthwise. The same is shown provided with a hand wheel 61 and at one side so that the shaft may be adjusted as desired, the same being threaded into one gear, and slidably extending through the other. The preceding description of the paper handling mechanism when in the roll applies to all of the devices shown in Fig. 1.

Referring to Fig. 1, the paper 2 from roll 22, which constitutes one exterior covering of the board, extends over a roll 64 or its equivalent and through a guiding and alining device 68 (see Fig. 7), which is provided with flanges 69. This device, as shown, is of curved construction and alines the lower sheet of paper at the point where it enters upon the table. The paper being arched may be pushed sidewise as needed without crumpling up. At this point I prefer to score the paper as previously mentioned, as illustrated in Figs. 25 to 29, to produce a desired finish. For scoring the paper one or more suitable scoring wheels or the equivalent are provided so as to score the paper at one or both sides, preferably at both sides. In this connection it may be mentioned that I have illustrated two independent scoring devices, the same being so arranged that in case one set or part thereof for any reason becomes inoperative, the other set or part may be immediately employed so that there may be no delay or imperfect product produced. I have indicated the scoring mechanism in Fig. 1 by the numeral 70, and the same is shown in detail in Figs. 10, 11 and 12. Referring particularly to these figures, 74—75 represents scoring wheels or the equivalent arranged at the sides of the machine at a point to score the paper adjacent each edge, two sets of the same being shown. I have illustrated the set out of operative position by the numerals 76 and 77. These are mounted above a table 71—72 and carried by standard 73 or the equivalent on the main frame or table 11. The cutters 74—75 and 76—77 may be of carborundum, emery, metal or other suitable material which will score the paper to the desired extent, the same ordinarily being driven at high speed. The table parts 71 and 72 are formed with openings under the wheels for scoring, and arranged below the wheels and adjustable relative the same are adjustable table parts 81, each of which is preferably provided with an opening 82. These parts are arranged to engage with the dove-tail or guide portion 83 on the table, and are actuated by shafts 84 or the equivalents, which are shown provided with hand wheels 85. By making members 81 adjustable, the scoring may be modified as illustrated in the Figs. 25, 26, etc., referred to. This also permits their adjustment when the cutters are adjusted for different widths of paper used for making different widths of boards.

The cutters are shown carried by shafts 88 mounted in bearings 89, which bearings are so adjustable that the cutters may be raised or lowered as shown in Fig. 11, in which one side is shown lowered and the other side raised. For the purpose I have shown spaced plates 94 which carry the arms 90 supporting the bearings 89. The arms 90 are mounted on shafts 91 carried by the brackets 93, the same being arranged to be tightly secured in the brackets by bolts 96 or equivalent means for the purpose extending through part 93 and clamping part 95. The arm 90 is shown provided with an extended part 99 which carries an adjusting screw 100, by means of which the cutters may be adjusted and maintained in place so as to bear against the paper to produce the desired scoring depth. As shown, brackets 93 are formed to slidably engage with the plates 94, their movement being controlled and the same locked in a desired position by the bolts or shafts 97, which may be actuated by hand wheels 98. As will be obvious, all of the cutters are controlled independently so that if any one becomes inoperative the other one may be thrown into operation immediately. They may be adjusted as desired, so that the paper may be scored for different sized boards and the adjustment quickly made should it be necessary. I have shown (see Fig. 1) shaft 88 driven by pulleys 101, belts 102 and driving pulleys 103, it being understood that any equivalent may be employed.

Referring to Figs. 1 and 11, the space between the plates 94 is shown connected with a discharge pipe 104, the scoring mechanism being inclosed within a hood 105. Openings 106 are provided adjacent the paper so that if pipe 104 is connected with an exhaust fan or the equivalent all dust, grit and the like will be drawn from the scoring wheels and discharged at a point where it will not be injurious to the operator of the machine. Rolls 107 and 108 are shown adjacent the table parts 71 and 72 to maintain the paper sheet 2 in contact with the table, from which the same extends over the roller 109, thence under the roller 110, the same then passing to the conveyer belt 12. It is sometimes desirable to treat the paper before passing to the rolls 16—17, or the similar rolls shown, this being particularly the case where two ply board (no intermediate sheets 6 being inserted) is being manufactured. For this purpose I show a steam receptacle 114 having a steam chamber communicating with the steam pipe 115. The lower sheet of paper passes over the belt 12, through the rolls and toward the discharge end of the machine. Before passing the rolls 16 and 17, however, it is folded over as will be more fully explained hereafter.

Before describing the rolls and folding mechanism, etc., which are effective after the plaster, plaster Paris or the like has been discharged onto the paper carried by the belt 12, I will describe the apparatus for mixing the plastic mass and discharging it on the moving cover sheet.

Referring particularly to Figs. 3, 4 and 5, 120 represents a discharge spout, or the equivalent, from which a supply of plaster Paris or other suitable material is discharged, it being immaterial what container or conveying mechanism is employed to discharge the material into spout 120 or its equivalent so that it may be utilized. It is also immaterial just what the particular component parts of this material may be, as this may vary to some extent. It may be said, however, that it is preferably plaster Paris or the like, it being understood that by this term I wish to include any material or combination of materials which may be employed in the machine herein described. The mechanism to be described herein is provided one for each set of rolls 16—17, 18—19, etc., shown in Fig. 1, the total number depending on the design of the machine, but inasmuch as the same are all similar and one or more may be used, a description of one will be sufficient for all. The material is conveyed from the spout 120 or its equivalent to a discharge point over the moving sheet of covering material, in the preferred construction, by a belt of suitable material, passed over suitable pulleys 122, 123, 124 125 or their equivalents. I also prefer to provide a wiper or scraper 126 which will clean the belt or conveyer and prevent accumulated material from remaining on the belt. In my improved apparatus I pass the belt through a body of water, or the equivalent, as well as first spraying the same, however, arranging the same on the conveyer that it is well distributed and so that it will present as much material to the action of the water as possible. The spraying prevents the material from floating off the conveyer when entering the bath. After the same has been mixed with the water and carried toward the covering material, the same is agitated or stirred, it having been found that this thoroughly mixes the product and has a bearing on it in setting. Referring to the several figures particularly referred to, 128 is a bed over which the conveyer 121 passes from a tank 129 provided with the side walls 130, 131 being the water which is to be applied to the material. The bed 128 is provided with sides 127, arranged to lift the side edges of the belt (see Figs. 1 and 3) and retain the material on the belt. 132 represents one of the spraying devices connected by feed pipe 133, it being understood that any equivalent construction may be employed. The water tank or receptacle is provided with an over-flow pipe 136 which is so arranged as to maintain a constant level in the tank. As shown, (see Figs. 4 and 5), the receptacle is provided with an offset portion 135 at one side so that the over-flow pipe will not interfere with or be obstructed by the conveyer. A similar receptacle 137 is arranged at the opposite side and provided with an intake pipe 138 which may be connected to supply pipe 139, the admission of water being controlled by valve 140 or its equivalent. The water is maintained at substantially a constant level.

Referring to Fig. 5, it will be noted that at the receiving end of the conveyer a stationary table part 141 is provided. Above this is mounted a spreader 142 which is preferably constructed with grooves or the like so as to produce a series of grooves 145 and ridges 144 in the material carried by the belt. This forms channels and causes a greater surface of the material for the uniform ingress of water through the dry mixture. Obviously, the same may be driven in any suitable manner, and it is preferably rotated so that the underside runs in the opposite direction to the travel of the conveyer, as indicated in Fig. 5. I prefer to provide scrapers or cleaners 147 which will keep the roll 142 comparatively clean. I have shown a gate 148 which levels and prevents an excess of material being carried along at any point on the belt. This evens and distributes the material so that it is of substantially uniform depth on the belt as it passes under the grooving roll 142. The same may be controlled by a rod 149 and arm 150 extending to the front of the machine, so that the operator can vary the amount of material at such times as may be desired.

I have found it desirable to stir and agitate the material carried by the conveyer after the same has been sprayed by the atomizer 132 and passed through the water tank. In the construction shown, I have illustrated three stirring devices consisting of one or more arms 153, each of which is preferably provided with a tip or end 155 of glass, rubber, or the equivalent material. The arms 153 are mounted in a head 154, suitably carried by a frame 156 (see Figs. 1, 2 and 3). Pulleys 157 and belt 158 are shown for driving the several stirrers, the belt being driven by pulley 159, pulley 160, belt 161 and intermediate gearing or the equivalent. The stirring mechanism shown is a simplified form which may be used and which I have illustrated in the machine as a simplified construction. A modified stirring mechanism is illustrated in Fig. 46 and this will be more fully described hereafter, it being understood that the mechanism shown in Fig. 46 may be substituted for that shown in Fig. 3. It may be mentioned that I prefer to make the stirrers so that they may be raised out of engagement with the material M at such times as may be desired. For this purpose I provide a bar 166 arranged to be operated from the front of the machine, the same being formed with inclined faces 167, or in any equivalent manner to raise the several stirrers when the bar 166 is pulled out, or to drop them into operative position when the same is as shown in Fig. 3. The mechanism just described prepares the material and discharges it on the conveyed sheets on the conveyer 12. Where two ply board is made, ordinarily only one conveyer 121 is operated. When the machine is operating for two ply board (no sheets 6 employed) no paper is taken off from rolls 26, and the mechanism (see Fig. 1) from the conveying mechanism at the right of rolls 17 and 18 is not used, the steam container 114 may, however, be used. However, sections taken through these various mechanisms will correspond, with the exception of the folding mechanism, and the mechanism at rolls 16 and 17.

Referring particularly to Figs. 1, 13, 14, 15 and 16, 170 represents a suitable standard arranged at each side of the main frame of the machine and carried by table 11. At these standards, there being a pair for each set of rolls 16—17, 18—19, 20—21, and such other rolls as may be provided, are arranged the pressure rolls, between which the belt 12 extends, carrying the covering material, plastic material, etc. Roll 16 is provided with a shaft 172 and roll 17 with shaft 171, the other rolls being similar, a description of one part will be sufficient for all. Shaft 171 is carried by the bearing blocks 173 and shaft 172 by the bearing blocks 174, these being arranged in the standards 170. In addition to the weight of the rolls 17, I prefer to provide a spring 177 and plate 178 for maintaining the roll in operative position. As shown, a bolt or stud 186 or the equivalent extends through the plate 178 at each side of the machine and engages with the bearing block 171. Arranged on the upper end of the stud and bearing on plate 178 is a nut 187 or its equivalent. Obviously by adjusting the nut, the downward travel of the block 173 may be limited at any desired point, so that the upper rolls are supported and maintained apart the desired distance, but may give or move upwardly when required. Pressure, however, is exerted on the rolls by the springs. The spring, however, permits the rolls to separate should an emergency require the same. As shown, what may be termed a table 175 carried by the standard 176 is arranged in advance of the rolls and carries the belt 12 at that point. The paper 5 extends from the roll over a roll 179, down over roll 17 where it is applied to the board, as indicated in Fig. 23. I have shown bars 180 and 181 extending across the machine parallel with the rolls, these carrying scrapers 182 extending across the roll and 183 arranged at the ends which serve to keep the rolls clean at the ends and prevent excess material accumulating thereon. As shown, a bracket 184 is provided on the shafts, and these coöperating with the thumb screw 185 provide convenient adjustment. In view of the fact that the lower roll 16 is not adjustable, bar 181 may be fixed in place. As most clearly shown in Figs. 15 and 16, a standard 190 is provided which carries an adjustable slide 191, upon which is mounted a guide member 192. This particular guide is a portion of the turning mechanism and will be described hereafter, the same being employed only at the rolls 16 and 17. The parts 191 at each side carry an adjustable plate 201, which is preferably provided with a glass plate 204 or its equivalent. Referring particularly to Figs. 15 and 16, member 191 is adjustable by means of the screw member 193, which may be provided with a hand wheel 194 or its equivalent, the member 193 being threaded to engage the part 195. Obviously, turning the hand wheel or member 193 at each side of the machine shifts member 191. As shown, member 191 also carries a member 198, which is adjustably secured thereto by a bolt 199 or its equivalent, the arrangement being such that member 198 is vertically adjustable and is raised and lowered by member 199. The same is provided with an extending part 200 to which member 201 is secured at 202, 202 being a bolt for pivotally securing the parts together. As shown, member 201 is maintained in operative position by a spring 203 or its equivalent. The adjustment of the same about the bolt 202 is controlled by a bolt 205 pivotally secured thereto at 206. Mounted on the bolt is a nut 207 provided with an operating handle 208. The nut is maintained against lengthwise movement, but rotatably secured on part 198, and obviously as the nut is turned the position of member 201 and its plate 204 is as desired. Member 204 preferably extends to a point between the rolls and carries a point member or plate 209 (see Fig. 16).

Figure 14:
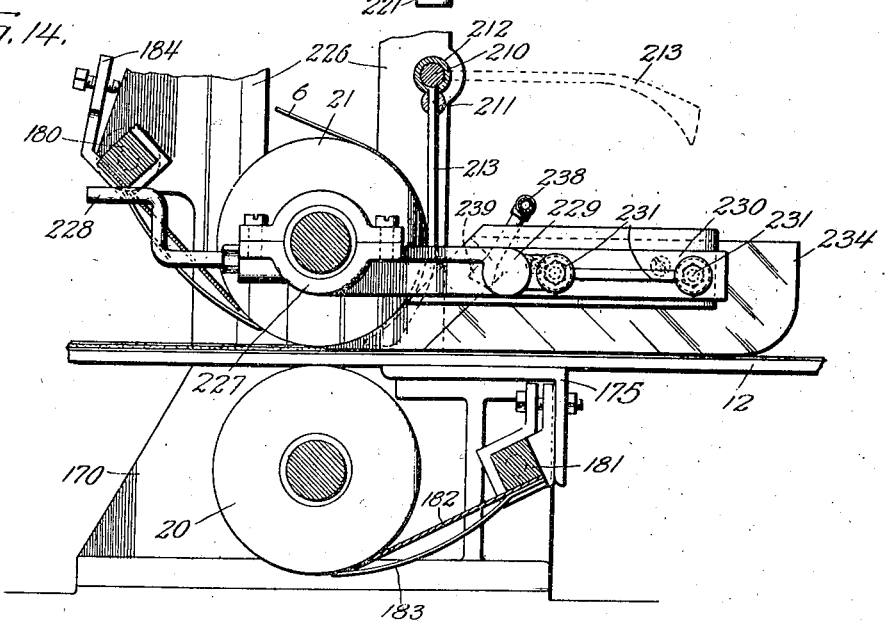
Fig. 14 is a sectional view taken substantially on line 14—14 of Fig. 13.

It has been found that a better product is obtained by agitating, stirring, distributing and leveling the material just before it passes under the rolls. For this purpose I have shown a plurality of reciprocating fingers or stirrers 213. In the construction shown, 211 is a bar or member slidably carried by the casing part 212, and arranged to be operated by a rod 210. As most clearly shown in Fig. 3, rod 210 is operated by a link 215 secured to an arm 216 driven by shaft 217. Shaft 217 may be driven in any suitable manner. The fingers 213 are preferably provided at each roll, the same leveling and distributing the material so that a more uniform product is obtained. The mounting of the rod in part 212 is clearly shown in Figs. 13 and 17, in which the standard 226 or 170, as the case may be, is provided with a lug or projecting part 225 through which the casing 212 projects, the same being formed with a pin 221 arranged to engage in suitable notches in the part 220. A spring 224 bearing against collar 233 in part 225 tends to normally maintain the same in the position shown in Figs. 13 and 17, collar 222 limiting the movement and serving as a stop. This permits the levelers 213 to be turned up as indicated in the dotted lines in Fig. 14. As most clearly shown in Fig. 17, as well as Fig. 16, I provide a pipe 219 arranged to discharge water or the like at each side of the roll on the glass plates, and if desired an atomizer 218 may be provided for discharging air so as to spray the water and break it into fine particles. A similar nozzle 239 on pipe 238 is arranged at the other rolls as shown in Figs. 13 and 14. The water keeps the plates clear, and prevents the plaster from adhering and accumulating thereon.

Referring to Figs. 13 and 14, as well as Fig. 2, a part 227 is provided arranged at each end of the rollers 19 and 21, in the construction shown the same being mounted on the shaft. A stop member 228 arranged to engage bar 180 is provided. Member 227 is extended as at 229, the extreme end being formed preferably as at 230. The part 230 carries a plate 232, the same being adjustably carried thereby by means of the adjustable members 231. Plate 232 preferably extends as at 233, and carries a plate 234 having an extended end 235. Plate 234 is preferably of glass or equivalent material and secured to plate 232 by screws 236 or their equivalents. A point plate 237 is also provided as shown in Figs. 13 and 14. Obviously plate 234 may be adjusted as desired.

As shown in Fig. 23, the edge 4 of the lower cover sheet is turned inwardly, and the mechanism for doing this is shown in Figs. 20 to 22 and Fig. 24, as well as Fig. 17. Referring to Fig. 20, at the rear of plate 204 is a suitably formed plate 241 which extends rearwardly as at 242, the same being inclined so as to turn the edge of the paper over as indicated in Fig. 23, where the same is engaged by plate 204 and completely turned in as shown in Figs. 20 and 24. In the preferred construction the top sheet is of such a width that the same will not extend inwardly to the edge of the board but be spaced therefrom as indicated by S in Figs. 21 and 23. The scoring previously described facilitates the bending and forming of the corners of the board as will be obvious by referring to Fig. 21. The operation will be more fully explained hereafter.

Where two ply board is to be made I sometimes, depending upon the grade of paper of covering material, find it desirable to steam or treat the covering material. For this purpose I have shown an inclosing member 244 and steam pipe 245 adjacent the guide 248 (see Fig. 8). By means of this the paper may be softened or made as desired. The casing part 244 may be made of canvas or any material suitable for the purpose. After leaving the rolls 16 and 17, I generally prefer to perforate one of the sheets so as to permit the escape of any confined air and prevent the forming of voids. For this purpose I have shown a perforating roll 246 (see Figs. 1 and 30) having prongs 247, which as the board is advanced provides a series of vents across the top of the board.

Referring to Figs. 1 and 31 to 34 inclusive, after the board has passed from the rolls 16 and 17 mechanism is preferably provided which will iron the edges of the board and straighten the same should this be found necessary, so that a straight edge will be produced. A simple form of apparatus for accomplishing this is shown in the figures referred to. 250 represents a bed or table over which the board B passes, and arranged at each side of the bed is a smoothing member 257—258 which engages the edge of the board and the top face. Arranged above the bed 250 are brackets 251 which are formed with members 252 at the end arranged to carry a slidable head 253 formed with a bearing 254 for the driving shaft 255, which drives the straightener 257. The head 253 is maintained in position so that 257 will engage the edge of the board by means of a spring 256 or equivalent means. In case the board should be over-sized the spring will give and prevent injury. The action of the smoother is illustrated in Fig. 34, in which the board is shown with the edge inclined requiring moving over in order to provide a perfect edge as desired. In case boards were made as indicated in Figs. 28 or 29, however, the straightener 257 would be formed to form the proper edge. I have shown shaft 255 driven by a pulley 259 which is driven by belt 260, this in turn being driven from a shaft 261. By providing a second pulley 262 and belt 263 and pulley 264 I drive the shaft at the opposite side of the board.

Any suitable apparatus may be provided to indicate or gage the width of the board as it passes through the machine so that the parts may be kept adjusted at all times to produce a uniform product. As shown in Figs. 37 to 41 inclusive, the board B passes between two edge engaging members 269 and 270. 269 is secured at one end to a suitably supported bar 268 and the other end carried in the swinging arm 271 which is pivotally secured on the bar 268 at 272. The arm 271 is extended as at 273 and connected by member 274 with the pointer 275. The pointer 275 is pivotally hung at 276 adjacent an indicating gage 277. As shown in Fig. 39, the bar 268 is suitably carried by cables 282 or the equivalent carried from a bar or ceiling 283. Arranged on the end of bar 268 is a shaft carrying an eccentric or cam member 281 arranged to be actuated by the thumb nut 280. When the eccentric member is turned up to engage the arm carrying weight 279, the same moves the arm 271—273 so as to bring shoe 270 out of engagement with the edge of the board. At this time, however, bar 268 carried by the cables 282 swings to a plumb position (as shown to the right), so that shoe 269 disengages with the opposite edge of the board. When the eccentric 281 is turned back as shown in Fig. 39, the counterweights 279 and 278 throw arm 271 to bring shoe 270 in engagement with the adjacent edge of the board, at the same time pulling the bar 268 so that shoe 269 is brought in engagement with the other edge of the board. It will thus be seen that except at such times as it is desired to gage or test the width of the board, the gaging mechanism is out of operation.

In order to maintain a uniform thickness and vary the adjustment of the machine so as to maintain this thickness I preferably provide a thickness gage, this being illustrated in Figs. 37, 42 and 43. In the construction shown a frame part 289 is carried by the frame parts 287 at each side of the machine. A roller 290 rotatably mounted on the shaft 291 arranged to be controlled by an arm 292 is provided, the same being positioned under the conveying belt 288, upon which is the board B. The shaft 291 is carried in eccentric supporting members 293. When it is desired to test or gage the thickness of the board arm or lever 292 may be turned, turning the shaft and supports 293 so that the roll is raised, raising the conveyer and board so that the board engages with the top roll 295 rotatably mounted on shaft 296. The second roller 295 carried by shaft 296, is supported in vertically adjustable blocks 297 arranged in the guide-ways 298. Mounted above the plates 289 are scales 299 arranged to operate with pointers 300 or indicators. These are pivotally supported at 301 and the members 289, and are formed with bell crank levers 302 arranged to engage in pins 303 at each end of the shaft 296. Obviously, as the upper roll raises the variation in the thickness of the board will be indicated on the scale. As with the width gaging device, the thickness testing or gaging device need only be operated from time to time to check the machine.

Before the board reaches the end of the machine and is cut off I prefer to iron or smooth the board. It is of course understood that after leaving the rolls 16 and 17 the plastic material sets before reaching the cutting mechanism, the ironing mechanism being placed at a point to obtain the best results, determined from practical experience and depending upon the kind of board and materials employed. Referring particularly to Figs. 35 and 36, I provide a conveyer preferably made up of sections 308 connected by portions 309 to shafts carried by the rollers 310. The several rollers are connected by the links 311 and so that the same substantially constitutes a sprocket chain which will run over the sprocket wheels 312 and 313 suitably carried by the frame 314. As shown, the frame carries a guide or conveyer support 315 over which the rollers 310 pass and are supported. One of the sprocket wheels, for illustration 313, is mounted in an adjustable box 316 so that the conveyer may be maintained without slack. Guides 315' may be provided for carrying the lower part of the chain, as shown in Fig. 35. Arranged above the conveyer is a belt 317 or the equivalent which, as shown, extends over pulleys 318, 319 and 320 carried on a frame 321. The belt 317 is arranged to travel above and with the board B and is maintained in contact therewith by rollers 322 on the frame 321. The frame 321 is carried by rollers 324 running in guides 323. As shown, the frame is adjustably mounted on the rolls so that the same may be raised or lowered as desired. While any equivalent mechanism may be employed, I have shown brackets 327 adjustably mounted in the parts 328 on the frame 321, the frame being provided with threaded shafts 329 or the equivalent carried by the parts 327. The shafts 329 are rotated by shafts 330 and intermediate gearing or the equivalent, 331 being a hand wheel for turning the shafts 329 to raise or lower the carriage. By mounting the frame or carriage 321 and parts carried thereby as shown, the same may be shifted along the board so that the ironing may take place at a predetermined point from the rolls 16 and 17, it being possible to adjust the machine so as to vary this point.

In order to cause the belt 317 to run true, I have provided a controlling mechanism consisting of the upright frame 333, which carries pulleys 337 and 338. These are mounted in a frame 334 which is pivotally anchored at 335 and supported at 336. The same has an extending arm 340 and carries the rollers 341 thereat extending over the top of the belt. This is arranged to engage the faces of the belt 317, and should the belt move to one side, will have a tendency to warp the belt at the rolls 337—338 and cause it to move toward the center and run true. While the belt 317 may be driven in any suitable manner, the preferred construction is such that shifting of the carriage will not affect the driving and require complicated adjustments. A simple method of doing this is to provide a standard 342 carrying pulleys 344 and 345, over which extends a belt 346 which drives pulley 343 arranged to drive pulley 320 through the shaft or clutch, or equivalent means. 347 represents belt pulleys, either one of which may be the driver.

Preferably at the extreme end of the machine I provide mechanism for cutting the board into the desired lengths. My preferred cutting off mechanism is so arranged that it will accurately cut the boards into pieces of the desired length, but which mechanism may be readily adjusted so that the pieces cut off may be shorter or longer as desired. An efficient cutting off mechanism is shown in Figs. 44 and 45, in which 350 and 351 represent suitable supports for the moving board B, F representing the frame of the machine. Cutters 353 are provided, and in this connection the cutters are so arranged that the board is cut while moving. As shown, the cutters are in the form of toothed bars mounted on the shafts 354 and driven by suitable intermediate gearing 355 or equivalent mechanism which is driven from pulley 356 by belt 357. The driving pulley 358 for 357 is driven from belt 359 or the equivalent. Suitable clutch mechanism, however, is provided, only the controlling rod 360 thereof being shown in Fig. 44. The construction is such that at a proper interval the clutch is thrown in and the cutters operated, after which the clutch is thrown out and the cutters remain idle. In the particular mechanism shown, the clutch is operated by raising rod 360 up, causing the cutters to operate in the desired predetermined manner. A simple mechanism for controlling the rod 360 is a dog 361 carried thereby and arranged to engage with the pin 363 on the wheels 362. There may be any number of pins depending upon the rate of travel of the wheel 362, and the length of the board cut off may be varied by merely shifting the pins. Wheel 362 is shown provided with teeth meshing with gear 365, and through the intermediate gearing 366, 367, 368 and 369 is driven by the wheel 370 in engagement with and moved by the board. Obviously the wheel 370 being in contact with the board is rotated by the moving board, the movement being transmitted through the gearing to the wheel 362, carrying the pins 363 referred to. Each time the pin comes in contact with part 361, it actuates rod 360, throwing in the clutch so that the pulley 358 is driven. The pulley is driven for an interval and then the clutch releases the same. As the pulley is driven, however, power is transmitted through belt 357 to the gearing which is operatively connected with the shafts 354. The first set of cutters 353 cut the board and as the board travels on, the second set of cutters are so timed that they will cut the board at substantially the same point, the teeth being so arranged (see Fig. 45) that the board is entirely severed. It is believed that the construction will be obvious, it being possible to vary the operation of the clutch rod 360 by changing the pins 363 as mentioned, or by changing the intermediate gearing or wheel 370 so as to cut the boards into predetermined lengths.

In Fig. 46 a modified arrangement of stirring device on the conveyer belt 374 is shown, this conveyer belt corresponding with conveyer 121 shown in Fig. 3. In this case a plurality of arms 375 are provided, each having a plate 376 of suitable size, shape and material (preferably glass or the like), the same being driven by belt 377 or the equivalent. In this case the plates 376 may be so designed as to practically trowel and thoroughly stir the mixture but in a little different fashion than the device previously described.

The operation of the device may be briefly described as follows: The rolls of paper or other fibrous material suitable for the purpose are deposited on the supports 34 (see Fig. 8) by means of the hoists, the lowering of members 37 depositing the rolls on the roll-ways 36. The operation of the hoisting mechanism is so obvious in view of the very complete disclosure in the description of the mechanism that further description of this apparatus is unnecessary. The paper passes from roll 22 under the guide 69, is passed through the scoring device and onto the conveyer 12 between the rolls 20—21, 18—19, and 16—17. Paper from rolls 26 passes under the rolls 21 and 19 and under the roll 17, while paper 5 from roll 25 is passed under roll 17.

The guide 69 accurately centers and guides the paper, and in this connection it will be noted that the guide being curved the paper is of considerable stiffness so that it may be pushed from side to side and held firmly in place so as to run true. As the same passes under the scoring wheels the same is scored substantially as shown in Figs. 25, 26 and 27, where an edge is to be produced similar to that shown in Fig. 23. If an edge is to be produced similar to that shown in Fig. 28 or Fig. 29 the table parts 81 are shifted as desired by means of the shafts 84 and hand wheels 85. The scoring devices may be adjusted as described in explaining the construction. Only one set of scoring wheels are used at each side of the paper, the cutting of the same in the paper being regulated by the thumb screw 100 or the equivalent. In case of the breaking of one scoring wheel, the one at the opposite side may be dropped into operative position immediately without stopping the machine. Any dust resulting from the scoring will be sucked up through the flue 104.

The several conveyer belts 121 are driven and material is deposited from the spout 120 or the equivalent on the belt and carried toward the belt 12, upon which is arranged the paper. A description of one of the conveyers will suffice for all as they are all similar, operating together or singly as the case may be. The amount of material carried along by the belt is gaged by the dam or leveling member 148, this spreading and evening the material on the belt. By raising or lowering the spreading member 148 at any time the amount of material may be increased or decreased. This may be conveniently controlled from the front of the machine or adjacent belt 12 by the rod 149 which extends forward to a convenient point. The material on the belt passes under the roll 142, which forms a series of ridges and grooves as most clearly shown in Figs. 4 and 6, and the desired amount of water is discharged on the same from the nozzles 132. The material carried by the belt thence passes through the water bath 131 and thence under the spreaders or agitators 155. These stir, agitate and mix the mass which becomes plastic or sloppy, and in this connection it may be mentioned that by controlling the operation of the agitators the time required for the material to set may be varied to a considerable extent. When the same is discharged upon the fibrous material or paper, the same is in a plastic state.

I shall first describe the handling of the plastic material dropped on sheet 2 from the conveyer. This material is deposited and (see Fig. 13) is carried on the traveling sheet toward the rolls 20 and 21. It is maintained spaced from the edge of the sheet 2 by the adjustable guard or member 232, which is provided with the glass face or the equivalent. Just before passing under the roll the material is leveled and evenly distributed in front of the roll by the spreaders 213. Material is prevented from accumulating on the guards 234 by the water discharged from nozzle 239, which may be atomized or discharged on the guard in a fine spray. As the same passes between the rolls, which are adjusted as desired, the paper 6 that is extending over the roll 21 is deposited on the top of the mass and lays flat thereon, the rolls forming a board of uniform thickness between the two sheets.

As the conveyer 12 travels, material from the next conveyer is deposited thereon in the same manner and carried with the paper 6 between the rolls 18 and 19, the same moving toward the rolls 16 and 17. Material from this conveyer is deposited upon the board upon the top sheet 6 just applied. Between the rolls 16 and 18, however, the extreme edges of the lower sheet 2 are engaged by the turning members 241 (see Figs. 1, 12 and 22), the same being turned over upon engagement with the paper with the under face of the members 204 (see Figs. 17 and 22, as well as Fig. 20). The material is spread and distributed in front of the rolls by the distributers 213, the face of plate 204 being kept scoured or cleared of material by the water from the nozzle 219 which may be sprayed on or atomized by means of the air from pipe 218. As the partially completed board passes between the rolls 16 and 17 the top sheet 5 is applied, the rollers pressing the top sheet in place and forming the board substantially as shown in Fig. 23. It should be understood that at this time the material is not completely set, this taking place after an interval. Of course, the rolls 16—17, 18—19 and 20—21 are adjusted the desired distance apart by adjusting nuts 187, as are also the plates 234, 204 and the turning members 241, so as to produce board of the desired thickness and width. In case the gages or tester for width and thickness show variations from the desired size the machine may be readjusted. It is of course obvious that it may be necessary to either change the paper rolls or to trim a portion of the edges thereof where changes are to be made in the width of the board manufactured, and the guides, scorers and other parts are adjusted as found necessary.

After leaving the rolls 16 and 17, the formed board in the machine shown passes under the perforator 246, thus forming a series of vents which will permit the escape of air when the board is ironed, and prevent the formation of voids. The board then passes between the edge straighteners 257 and below the flanged portions 258 thereof, so that the edges are trued and brought into shape substantially as indicated in Fig. 34. After this the same passes the width gaging device illustrated in Figs. 38 to 41, any variation in width being indicated on the scale 277. The width gaging device need not be in operation all the time, and may be thrown out of operation by turning the part 280 so as to bring the cam member into engagement with the rod hearing counter-weight 279, thus shifting the arm 271—273 to a point where the shoes 269 and 270 will not engage the edges of the board.

The thickness of the board is indicated on the scale 299 of the thickness gage (see Figs. 37, 42 and 43).

The board travels along on the various conveyers until it reaches what may be termed the ironing device or its equivalent, and thence reaches the cutting off mechanism. The preferred form of ironing device is shown in Figs. 35 and 36 previously described. As the board passes along carried by the conveyer parts 308, belt 317 travels with the board and rolls 322 bearing against the top of the belt thoroughly iron and smooth the board, forcing out any air and giving a finished product. The ironing mechanism may be adjusted so as to perform its function at the desired point on the board, depending upon the setting or hardening of the plastic material. As before mentioned this varies. To vary the particular ironing point carriage 321 is shifted toward or from the rolls 16 and 17. After leaving the ironing mechanism, the same passes between the cutters, the measuring wheel 370 through intermediate mechanism throwing the clutch into engagement at predetermined points to cause the operation of the cutters. The first set in the construction shown cuts through, and the same is so geared that after a proper interval the second set operates at a point to substantially register with the first set, as will be clear from a reference to Fig. 45, so that the board is substantially severed. If not completely severed a slight elevating of the extreme end or free end of the piece fractures the board and permits the removal of the cut piece.

Where the board is made without the two intermediate sheets 6, and it should be understood that the machine may be constructed to apply any number of intermediate sheets, the intermediate conveying mechanism and paper rolls between roll 25 and roll 22 are omitted, the rolls 18—19, 20—21, etc., being in this case inoperative in so far as doing any work is concerned. In this case the material is discharged adjacent the rolls 16 and 17, the extreme edges of the sheet 2 being turned over in the manner previously described. It will be obvious from the preceding that the machine may be so adjusted as to make the board of any desired width or thickness within the capacity of the machine. Where the board is made up with only the two cover sheets 2 and 5, it is frequently desirable to treat the paper either by wetting or steaming, and in this case the sheet 2 may be steamed as it passes through the steam container 114, and sheet 5 may be steamed or otherwise treated as it passes (see Fig. 8) the steam container 244. These treatments are sometimes desirable where the paper or the equivalent employed is not always uniform. The various mechanisms described coöperating together produce a product which is uniform in width, length, thickness, appearance and finish, and the same may be so controlled as to produce a continuous uniform product, regardless of the possible varying conditions or characteristics of the materials used. The product is also uniform regardless of weather conditions or temperature, so that consequently there are no waste pieces or culls. Changes from various sizes and from two or more ply board may be made rapidly and conveniently, and the machine adjusted and operated with a minimum of labor. It has been found by experience that the machine has a greater output of a better product in a stated time, and at less expense than where manual labor is employed to perform operations performed by the machine.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:—

1. In a plaster board machine of the kind described and in combination, board forming mechanism including pressure rolls, a conveyer belt passing therebetween, means for supplying a plurality of superimposed fibrous sheets of material to the conveyer, means for depositing plastic material on the lower sheet, means for folding the edges of the lower sheet over the plastic material whereby the contained material is inclosed at each edge of the board and on the top and bottom faces, and means for straightening and smoothing the edges of the board after the same is formed.

2. In a plaster board machine of the kind described and in combination, board forming mechanism including pressure rolls, a conveyer belt passing therebetween, means for supplying a plurality of superimposed fibrous sheets of material to the conveyer, means for depositing plastic material on the lower sheet, means for folding the edges of the lower sheet over the plastic material whereby the contained material is inclosed at each edge of the board and on the top and bottom faces, means for straightening the edges of the board, and means for ironing the formed board.

3. In a plaster board machine of the kind described and in combination, board forming mechanism including pressure rolls, a conveyer belt passing therebetween, means for supplying a plurality of superimposed fibrous sheets of material to the conveyer, means for depositing plastic material on the lower sheet, means for folding the edges of the lower sheet over the plastic material whereby the contained material is inclosed at each edge of the board and on the top and bottom faces, means for straightening the edges of the board, means for ironing the formed board, and means for cutting the board into pieces of predetermined lengths.

4. In a plaster board machine of the kind described, a frame, a plurality of coöperating rolls carried by said frame, a conveyer passing between said rolls, means for discharging a plastic mass on a sheet of fibrous material carried by said conveyer, means adjacent said rolls for leveling and distributing the plastic material on said sheet whereby upon the positioning of a second sheet of fibrous material on the plastic mass the material will be substantially evenly distributed therebelow.

5. In a plaster board machine of the kind described, a frame, a plurality of coöperating rolls adjustably carried by said frame, a conveyer passing between said rolls, means for discharging a plastic mass on a sheet of fibrous material carried by said conveyer, reciprocating means adjacent said rolls for leveling and distributing the plastic material on said sheet whereby upon the positioning of a second sheet of fibrous material on the plastic mass the material will be substantially evenly distributed therebelow.

6. In a plaster board machine of the kind described, a frame, a plurality of coöperating rolls carried by said frame, a conveyer passing between said rolls, means for discharging a plastic mass on a sheet of fibrous material carried by said conveyer, reciprocating means adjacent said rolls for leveling and distributing the plastic material on said sheet whereby upon the positioning of a second sheet of fibrous material on the plastic mass the material will be substantially evenly distributed therebelow, and means for keeping the plastic mass from the side edges of the lower sheets.

7. In a plaster board machine of the kind described, a frame, a plurality of coöperating rolls carried by said frame, a conveyer passing between said rolls, means for discharging a plastic mass on a sheet of fibrous material carried by said conveyer, reciprocating means adjacent said rolls for leveling and distributing the plastic material on said sheet whereby upon the positioning of a second sheet of fibrous material on the plastic mass the material will be substantially evenly distributed therebelow, adjustable means for keeping the plastic mass from the side edges of the lower sheets, and means for keeping the plastic mass from adhering to said means.

8. In a plaster board machine of the kind described and in combination, a frame, a plurality of pairs of coöperating rolls carried by said frame, a conveyer passing between the rolls of each pair, means for discharging a plastic mass in front of the rolls on sheets of fibrous material carried upon the conveyer and advancing between the rolls, reciprocating means adjacent said rolls for leveling and distributing the plastic mass on said sheets whereby upon the positioning of the successive sheets of fibrous material the material will be substantially evenly distributed, and means for turning the edges of the lower sheet of fibrous material over the side edges of the top sheet of fibrous material in advance of the passing of the sheets and plastic material between the last pair of rolls.

9. In a plaster board machine of the kind described and in combination, a frame, a conveyer movable thereover, means for supporting a roll of fibrous material adjacent thereto, and means for guiding said fibrous material onto said conveyer comprising a curved plate provided with flanges at each side arranged to engage the edges of the fibrous material.

10. In a plaster board machine of the kind described and in combination, a frame, a conveyer movable thereover, means for supporting a roll of fibrous material adjacent thereto, means for lifting said roll of fibrous material on said supporting means, means for guiding said fibrous material onto said conveyer comprising a curved plate provided with flanges at each side arranged to engage the edges of the fibrous material, and means for depositing the plastic material on said fibrous material, and means for superimposing a second sheet of fibrous material thereon.

11. In a plaster board machine of the kind described and in combination, a conveyer and means for supporting the same, means for supporting a roll of fibrous material, a roll of fibrous material carried by said support and extending to said conveyer, means for suitably scoring said fibrous material adjacent each edge thereof, and means for turning the edges of the fibrous material upwardly and inwardly at said points of scoring.

12. In a plaster board machine of the kind described and in combination, a conveyer and means for supporting the same, means for supporting a roll of fibrous material, a roll of fibrous material carried by said support and extending to said conveyer, adjustable means for suitably scoring said fibrous material adjacent each edge thereof, means for depositing a plastic mass on said fibrous material on the conveyer, means for turning the edges of the fibrous material upwardly and inwardly at said points of scoring, and means for superimposing a second sheet of fibrous material on said mass and overlying said edges.

13. In a plaster board machine of the kind described and in combination, a conveyer, a plurality of sources of sheets of paper, said sheets extended to said conveyer, and means for scoring one of said sheets at each edge thereof in a predetermined manner, comprising a plurality of pairs of adjustable rotatable scoring wheels, and an adjustable paper carrying table arranged therebelow.

14. In a plaster board machine of the kind described and in combination, a conveyer, a frame carrying said conveyer, means at one side of said frame for mixing and discharging plastic material on a sheet of fibrous material carried by said conveyer, said mixing and discharging means comprising a suitable conveyer and means for supporting the same, a water bath container arranged in the path of said conveyer, and means for agitating the material after it has passed through said water bath and before it is discharged onto the sheet of fibrous material, comprising a plurality of rotatable agitators arranged above the conveyer and means for driving said agitators.

15. In a plaster board machine of the kind described and in combination, a conveyer, a sheet of fibrous material carried thereby, a frame carrying said conveyer, means at one side of said frame for mixing and discharging plastic material on a sheet of fibrous material carried by said conveyer, said mixing and discharging means comprising a suitable conveyer and means for supporting the same, a water bath container arranged in the path of said conveyer, means for spraying the material before entering the water bath, means for agitating the material after it has passed through said water bath and before it is discharged onto the sheet of fibrous material, and means for applying a cover sheet of fibrous material over said mass and first sheet.

16. In a plaster board machine of the kind described and in combination, material mixing and conveying mechanism comprising a belt and means for supporting and driving said belt, means for discharging material on the receiving end of said conveying mechanism belt, means for controlling the amount of material carried along with the belt, means for forming a series of alternate grooves and ridges in the material carried on the belt, means for spraying the material, a water bath arranged in the path of the material carried by said conveyer whereby the material is submerged in the bath, means for thereafter elevating the belt to raise the material out of the bath, and means for agitating and mixing the material carried by said conveyer before its discharge as a plastic mass from the conveyer.

17. In a plaster board machine of the kind described and in combination, material mixing and conveying mechanism comprising a belt and means for supporting and driving said belt, means for discharging material on the receiving end of said conveying mechanism belt, adjustable means for controlling the amount of material carried along with the belt, means for forming a series of alternate grooves and ridges in the material carried on the belt, means for spraying the material, a water bath arranged in the path of the material carried by said conveyer whereby the material is submerged in the bath after the spraying thereof, means for thereafter elevating the belt to raise the material out of the bath, and vertically adjustable means for agitating and mixing the material carried by said conveyer before its discharge as a plastic mass from the conveyer.

18. In a plaster board machine of the kind described and in combination, an ironing device comprising a movable conveyer having a substantially non-yieldable conveying face, a belt movable over and with said conveyer, and coöperating means for maintaining said belt in close contact with the board carried by the conveyer and exerting pressure on the belt.

19. In a plaster board machine of the kind described and in combination, an ironing device comprising a movable conveyer having a substantially non-yieldable conveying face, a belt movable over and with said conveyer, coöperating means for maintaining said belt in close contact with the board carried by the conveyer and exerting pressure on the belt, and adjustable means for carrying said belt and coöperating means.

20. In a plaster board machine of the kind described and in combination, an ironing device comprising a movable conveyer having a substantially non-yieldable conveying face, a belt movable over and with said conveyer, coöperating means for maintaining said belt in close contact with the board carried by the conveyer and exerting pressure on the belt, means for guiding said belt, adjustable means for carrying said belt and coöperating means, and adjustable driving means for said belt.

21. In a plaster board machine of the kind described and in combination, board forming mechanism comprising a plurality of rolls, a conveyer passing between said rolls, a plurality of sheets of fibrous material, means for depositing plastic material on the lower sheet and turning the lower edges of the lower sheet thereover under the top sheet, and means for perforating the top sheet after the formed board has passed through said rolls.

22. In a plaster board machine of the kind described and in combination, a board forming mechanism comprising a plurality of rolls, a conveyer passing between said rolls, a plurality of sheets of fibrous material, means for depositing plastic material on the lower sheet and turning the lower edges of the lower sheet thereover under the top sheet, and means for smoothing the board after the formed board has passed through said rolls, said means arranged to gage the board whereby the uniform product is produced.

23. In a plaster board machine of the kind described and in combination, board forming mechanism comprising a plurality of rolls, a conveyer passing between said rolls, a plurality of sheets of fibrous material, means for depositing plastic material on the lower sheet and turning the lower edges of the lower sheet thereover under the top sheet, and means for perforating the top sheet and smoothing the board after the formed board has passed through said rolls.

24. In a plaster board machine of the kind described and in combination, board forming mechanism comprising a plurality of rolls, a conveyer passing between said rolls, a plurality of sheets of fibrous material, means for depositing plastic material on the lower sheet and turning the lower edges of the lower sheet thereover under the top sheet, and means for perforating the top sheet after the formed board has passed through said rolls, means for thereafter smoothing the board, and means for cutting the board into predetermined lengths.

25. In a plaster board machine of the kind described and in combination, cutting off mechanism comprising a plurality of cutters and means coöperating with and dependent upon the travel of the moving board for controlling said cutters, whereby the same automatically operate to cut the board into a plurality of pieces of predetermined lengths.

26. In a plaster board machine of the kind described and in combination, cutting off mechanism comprising a plurality of sets of cutters and means coöperating with and dependent upon the travel of the moving board for controlling said cutters, whereby the same automatically periodically operate to cut the board into a plurality of pieces of predetermined lengths.

27. In a plaster board machine of the kind described and in combination, a frame, paper roll supports mounted thereabove, a conveyer movable over said frame, a pair of coöperating rolls arranged one above and one below the conveyer, means for guiding the paper from one paper roll to the conveyer, means between the conveyer and roll for scoring the paper adjacent the edges thereof, means for mixing and discharging a plastic mass on the paper carried by said conveyer, means for turning up the edges of the paper, means at each side of the machine for retaining the material deposited on the paper and turning the outer edges of the paper inwardly to overlie the material deposited thereon, and means adjacent said coöperating rolls for distributing and leveling the plastic material.

28. In a plaster board machine of the kind described and in combination, a frame, paper roll supports mounted thereabove, a conveyer movable over said frame, a pair of coöperating rolls arranged one above and one below the conveyer, means for guiding the paper from one paper roll to the conveyer, means between the conveyer and roll for scoring the paper adjacent the edges thereof, means for mixing and discharging a plastic mass on the paper carrier by said conveyer, means for turning up the edges of the paper, means at each side of the machine for retaining the material deposited on the paper and turning the outer edges of the paper inwardly to overlie the material deposited thereon, means adjacent said coöperating rolls for distributing and leveling the plastic material, and means for guiding a second sheet of paper between said rolls above the plastic mass.

29. In a plaster board machine of the kind described and in combination, a frame, paper roll supports mounted thereabove, a conveyer movable over said frame, a pair of coöperating rolls arranged one above and one below the conveyer, means for guiding the paper from one paper roll to the conveyer, means between the conveyer and roll for scoring the paper adjacent the edges thereof, means for mixing and discharging a plastic mass on the paper carried by said conveyer, means for turning up the edges of the paper, means at each side of the machine for retaining the material deposited on the paper and turning the outer edges of the paper inwardly to overlie the material deposited thereon, means adjacent said coöperating rolls for distributing and leveling the plastic material, means for guiding a second sheet of paper between said rolls above the plastic mass, and means for perforating the board discharged from said rolls.

30. In a plaster board machine of the kind described and in combination, a frame, paper roll supports mounted thereabove, a conveyer movable over said frame, a pair of coöperating rolls arranged one above and one below the conveyer, means for guiding the paper from one paper roll to the conveyer, means between the conveyer and roll for scoring the paper adjacent the edges thereof, means for mixing and discharging a plastic mass on the paper carried by said conveyer, means for turning up the edges of the paper, means at each side of the machine for retaining the material deposited on the paper and turning the outer edges of the paper inwardly to overlie the material deposited thereon, means adjacent said coöperating rolls for distributing and leveling the plastic material, means for guiding a second sheet of paper between said rolls above the plastic mass, means for perforating the board discharged from said rolls, and means for straightening the edges of the board.

31. In a plaster board machine of the kind described and in combination, a frame, paper roll supports mounted thereabove, a conveyer movable over said frame, a pair of coöperating rolls arranged one above and one below the conveyer, means for guiding the paper from one paper roll to the conveyer, means between the conveyer and roll for scoring the paper adjacent the edges thereof, means for mixing and discharging a plastic mass on the paper carried by said conveyer, means for turning up the edges of the paper, means at each side of the machine for retaining the material deposited on the paper and turning the outer edges of the paper inwardly to overlie the material deposited thereon, means adjacent said coöperating rolls for distributing and leveling the plastic material, means for guiding a second sheet of paper between said rolls above the plastic mass, means for perforating the board discharged from said rolls, means for straightening the edges of the board, and means for gaging the width and means for gaging the thickness of the formed board.

32. In a plaster board machine of the kind described and in combination, a frame, paper roll supports mounted thereabove, a conveyer movable over said frame, a pair of coöperating rolls arranged one above and one below the conveyer, means for guiding the paper from one paper roll to the conveyer, means between the conveyer and roll for scoring the paper adjacent the edges thereof, means for mixing and discharging a plastic mass on the paper carried by said conveyer, means for turning up the edges of the paper, means at each side of the machine for retaining the material deposited on the paper and turning the outer edges of the paper inwardly to overlie the material deposited thereon, means adjacent said coöperating rolls for distributing and leveling the plastic material, means for guiding a second sheet of paper between said rolls above the plastic mass, means for perforating the board discharged from said rolls, means for straightening the edges of the board, means for gaging the width and means for gaging the thickness of the formed board, and means for ironing the board and smoothing the faces thereof.

33. In a plaster board machine of the kind described and in combination, a frame, paper roll supports mounted thereabove, a conveyer movable over said frame, a pair of coöperating rolls arranged one above and one below the conveyer, means for guiding the paper from one paper roll to the conveyer, means between the conveyer and roll for scoring the paper adjacent the edges thereof, means for mixing and discharging a plastic mass on the paper carried by said conveyer, means for turning up the edges of the paper, means at each side of the machine for retaining the material deposited on the paper and turning the outer edges of the paper inwardly to overlie the material deposited thereon, means adjacent said coöperating rolls for distributing and leveling the plastic material, means for guiding a second sheet of paper between said rolls above the plastic mass, means for perforating the board discharged from said rolls, means for straightening the edges of the board, means for gaging the width and means for gaging the thickness of the formed board, means for ironing the board and smoothing the faces thereof, and means for cutting the board off into predetermined lengths.

34. In a plaster board machine of the kind described and in combination, a frame, paper roll supports mounted thereabove, means for receiving and depositing the paper rolls on said supports, a conveyer movable over said frame, a pair of coöperating rolls arranged one above and one below the conveyer, means for guiding the paper from one paper roll to the conveyer, means between the conveyer and roll for scoring the paper adjacent the edges thereof, means for mixing and discharging a plastic mass on the paper carried by said conveyer, means for turning up the edges of the paper, means at each side of the machine for retaining the material deposited on the paper and turning the outer edges of the paper inwardly to overlie the material deposited thereon, means adjacent said coöperating rolls for distributing and leveling the plastic material, means for guiding a second sheet of paper between said rolls above the plastic mass, means for perforating the board discharged from said rolls, means for straightening the edges of the board, means for gaging the width and means for gaging the thickness of the formed board, means for ironing the board and smoothing the faces thereof, and means for cutting the board off into predetermined lengths.

35. In a plaster board machine of the kind described and in combination, a frame, paper roll supports mounted thereabove, means for receiving and depositing the paper rolls on said supports, a conveyer movable over said frame, a pair of coöperating rolls arranged one above and one below the conveyer, means for guiding the paper from one paper roll to the conveyer, means between the conveyer and roll for scoring the paper adjacent the edges thereof, means for mixing and discharging a plastic mass on the paper carried by said conveyer, means for superimposing a sheet of paper on said mass, means for mixing and discharging a plastic mass on said superimposed sheet, means for turning up the edges of the cover sheet of paper, means at each side of the machine for retaining the material deposited on the paper and turning the outer edges of the paper inwardly to overlie the material deposited thereon, means adjacent said coöperating rolls for distributing and leveling the plastic material, means for guiding a second cover sheet of paper between said rolls above the plastic mass, means for perforating the board discharged from said rolls, means for straightening the edges of the board, means for gaging the width and means for gaging the thickness of the formed board, means for ironing the board and smoothing the faces thereof, and means for cutting the board off into predetermined lengths.

In testimony whereof, I have hereunto signed my name in the presence of two subscribing witnesses.

CLARENCE W. UTZMAN.

Witnesses:
 JOHN W. HILL,
 CHARLES I. COBB.